(12) United States Patent
Hazani

(10) Patent No.: US 11,791,656 B2
(45) Date of Patent: Oct. 17, 2023

(54) SYSTEMS AND METHODS FOR SYNCHRONIZING SUBUNITS IN A MULTI-UNIT POWER DISTRIBUTION NETWORK

(71) Applicant: Corning Research & Development Corporation, Corning, NY (US)

(72) Inventor: Ami Hazani, Raanana (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 27 days.

(21) Appl. No.: 17/236,798

(22) Filed: Apr. 21, 2021

(65) Prior Publication Data

US 2021/0336476 A1  Oct. 28, 2021

Related U.S. Application Data

(60) Provisional application No. 63/014,700, filed on Apr. 23, 2020.

(51) Int. Cl.
| | |
|---|---|
| *H02J 13/00* | (2006.01) |
| *H02J 1/00* | (2006.01) |
| *H04B 3/54* | (2006.01) |

(52) U.S. Cl.
CPC ......... *H02J 13/00026* (2020.01); *H02J 1/00* (2013.01); *H02J 13/00036* (2020.01); *H04B 3/54* (2013.01)

(58) Field of Classification Search
CPC .. H02J 13/00026; H02J 1/00; H02J 13/00036; H02J 2310/16; H02J 1/084; H04B 3/54; G06F 1/26
See application file for complete search history.

(56) References Cited

U.S. PATENT DOCUMENTS

| | | | |
|---|---|---|---|
| 5,774,316 | A | 6/1998 | McGary et al. |
| 6,584,197 | B1 | 6/2003 | Boudreaux et al. |
| 7,545,055 | B2 | 6/2009 | Barrass |
| 8,559,150 | B2 | 10/2013 | Veroni |
| 8,605,394 | B2 | 12/2013 | Crookham et al. |

(Continued)

FOREIGN PATENT DOCUMENTS

EP    1347607 A1    9/2003

*Primary Examiner* — Rexford N Barnie
*Assistant Examiner* — Thai H Tran
(74) *Attorney, Agent, or Firm* — William D. Doyle

(57) ABSTRACT

Systems and methods for synchronizing subunits a multi-unit power distribution network contemplate selectively opening and closing a switch at the power source to disconnect and reconnect the power source to power conductors to send a synchronization signal to one or more remote subunits. Once the remote subunits are synchronized and able to disconnect from the power conductors, leak detection at the power source may be enabled to detect inadvertent loads on the power conductors (e.g., a human touching the power conductors). Further, the remote subunits may power off and on based on the synchronization signal thereby ensuring that an end device may receive power concurrently from multiple remote subunits so as to meet the power requirements of the end device. Enabling the leak detection improves the safety features of the power distribution network and synchronized power delivery to the end device prevents improper shut downs.

15 Claims, 16 Drawing Sheets

(56) References Cited

U.S. PATENT DOCUMENTS

| | | |
|---|---|---|
| 8,781,637 B2 | 7/2014 | Eaves |
| 9,042,732 B2 | 5/2015 | Cune et al. |
| 9,240,835 B2 | 1/2016 | Berlin et al. |
| 9,325,429 B2 | 4/2016 | Berlin et al. |
| 9,497,706 B2 | 11/2016 | Atias et al. |
| 9,532,329 B2 | 12/2016 | Sauer |
| 9,673,904 B2 | 6/2017 | Palanisamy et al. |
| 9,685,782 B2 | 6/2017 | Blackwell et al. |
| 10,020,885 B2 | 7/2018 | Mizrahi et al. |
| 10,257,056 B2 | 4/2019 | Hazani et al. |
| 10,389,539 B2 * | 8/2019 | Picard ................. H02J 4/00 |
| 10,404,099 B1 | 9/2019 | Bonja et al. |
| 10,405,356 B2 | 9/2019 | Hazani et al. |
| 10,764,071 B1 * | 9/2020 | Ciholas ............ G06F 11/3058 |
| 2003/0178979 A1 | 9/2003 | Cohen |
| 2008/0164890 A1 * | 7/2008 | Admon ................ H04L 12/10 |
| | | 324/713 |
| 2011/0007443 A1 | 1/2011 | Crookham et al. |
| 2014/0243033 A1 | 8/2014 | Wala et al. |
| 2015/0077130 A1 | 3/2015 | Hackl |
| 2015/0207318 A1 | 7/2015 | Lowe et al. |
| 2015/0215001 A1 | 7/2015 | Eaves |
| 2016/0352393 A1 | 12/2016 | Berlin et al. |
| 2017/0025842 A1 | 1/2017 | Peterson |
| 2017/0054496 A1 | 2/2017 | Hazani |
| 2017/0070975 A1 | 3/2017 | Ranson et al. |
| 2018/0351633 A1 | 12/2018 | Birkmeir et al. |

\* cited by examiner

SYSTEMS AND METHODS FOR SYNCHRONIZING SUBUNITS IN A MULTI-UNIT POWER DISTRIBUTION NETWORK

RELATED APPLICATION

The present application claims priority to U.S. Provisional Patent Application No. 63/014,700, filed Apr. 23, 2020, and entitled "SYSTEMS AND METHODS FOR SYNCHRONIZING SUBUNITS IN A MULTI-UNIT POWER DISTRIBUTION NETWORK," the contents of which is incorporated herein by reference in its entirety.

BACKGROUND

The technology of the disclosure relates to a power distribution network and more particularly, to power interruptions in a multi-unit power distribution network.

Nearly every computing device needs power of some sort. In many instances, the power may be provided by a battery or a local power source such as a wall outlet or the like. However, in some instances, it may be inconvenient to supply power through a wall outlet or a battery. For example, the power demands or voltage levels of the item being powered may exceed that which is available through the conventional wall outlets (e.g., the item may need 340 Volts (V) instead of the conventional 110 V supplied by most US power outlets) or may consume sufficient power that battery supplies are impractical. In such instances, there may be a dedicated power distribution network associated with such items.

A few exemplary systems that may have associated power distribution networks include, but are not limited to, server farms, lightning systems, and distributed communication systems (DCS) such as a distributed antenna system (DAS) or radio access network (RAN). Such systems may have a central power source and one or more power conductors that convey power from the power source to one or more remote subunits (e.g., a server, a lighting fixture, a remote antenna unit, or the like). There is a concern that a human may come into contact with the power conductors and be shocked or electrocuted by such contact. Accordingly, some regulations, such as International Electric Code (IEC) 60950-21, may limit the amount of direct current (DC) that is remotely delivered by the power source over the conductors to less than the amount needed to power the remote subunit during peak power consumption periods for safety reasons.

One solution to remote power distribution limitations is to employ multiple conductors and split current from the power source over the multiple conductors, such that the current on any one electrical conductor is below the regulated limit. Another solution includes delivering remote power at a higher voltage so that a lower current can be distributed at the same power level. For example, assume that 300 Watts (W) of power is to be supplied to a remote subunit by the power source through a conductor. If the voltage of the power source is 60 V, the current will be 5 Amperes (A) (i.e., 300 W/60 V). However, if a 400 V power source is used, then the current flowing through the wires will be 0.75 A. While such variations may lower the current, delivering high voltage through electrical conductors may be further regulated to prevent an undesired current from flowing through a human in the event that a human contacts the electrical conductor. Likewise, there may be a need to prevent the line current from exceeding maximum allowed current values.

Various solutions have been proposed to meet the various regulations while still providing the power needed to the remote subunits. One such approach is to disconnect the remote subunit from the power source and measure activity on the power conductors. Activity that falls within certain profiles may be indicative of a human contacting the power conductors and appropriate remedial steps may be taken until the situation can be investigated and/or corrected. While the safety feature of such a system is desirable, there is still a need to synchronize the remote subunits with one another in a multi-unit system. Likewise, where multiple subunits combine to provide power to an end device, such provision must be synchronized.

No admission is made that any reference cited herein constitutes prior art. Applicant expressly reserves the right to challenge the accuracy and pertinency of any cited documents.

SUMMARY

Embodiments disclosed herein include systems and methods for synchronizing subunits in a multi-unit power distribution network. In particular, exemplary aspects of the present disclosure contemplate selectively opening and closing a switch at a power source to disconnect and reconnect the power source to power conductors to send a synchronization signal to one or more remote subunits. Once the remote subunits are synchronized and able to disconnect from the power conductors, leak detection at the power source may be enabled to detect inadvertent loads on the power conductors (e.g., a human touching the power conductors). Further, the remote subunits may power off and on based on the synchronization signal thereby ensuring that an end device may receive power concurrently from multiple remote subunits so as to meet the power requirements of the end device. Enabling the leak detection improves the safety features of the power distribution network and synchronized power delivery to the end device prevents improper shut downs.

In this regard, in one embodiment, a remote subunit is provided. The remote subunit comprises a power input port configured to be coupled to a power conductor and receive a power signal from a power source therefrom. The remote subunit also comprises a switch coupled to the power input port. The remote subunit also comprises a first power output port configured to be coupled to a second power conductor to provide power from the remote subunit to a second cascaded remote subunit. The remote subunit also comprises a controller circuit. The controller circuit is configured to detect a first synchronization signal comprising a first periodic voltage drop in the power signal and time opening and closing of the switch based on the first synchronization signal.

In an additional embodiment, a power distribution network is provided. The power distribution network comprises a power source, a power conductor coupled to the power source, and a remote subunit. The remote subunit comprises a power input port configured to be coupled to a power conductor and receive a power signal from a power source therefrom. The remote subunit also comprises a switch coupled to the power input port. The remote subunit also comprises a first power output port configured to be coupled to a second power conductor to provide power from the remote subunit to a second cascaded remote subunit. The remote subunit also comprises a controller circuit. The controller circuit is configured to detect a first synchronization signal comprising a first periodic voltage drop in the power signal and time opening and closing of the switch based on the first synchronization signal.

In an additional embodiment, a method is provided. The method comprises, at a remote subunit, opening a switch to disconnect a load from a power conductor. The method also comprises closing the switch to connect the load to the power conductor and receive a power signal therefrom. The method also comprises detecting a first synchronization signal comprising a periodic voltage drop in the power signal. The method also comprises synchronizing opening the switch to the first synchronization signal.

In an additional embodiment, a distributed communication system (DCS) is provided. The DCS comprises a central unit. The central unit is configured to distribute received one or more downlink communications signals over one or more downlink communications links to one or more remote subunits. The central unit is also configured to distribute received one or more uplink communications signals from the one or more remote subunits from one or more uplink communications links to one or more source communications outputs. The DCS also comprises a plurality of remote subunits. Each remote subunit among the plurality of remote subunits comprises a power input port configured to be coupled to a power conductor and receive a power signal from a power source therefrom. Each remote subunit also comprises a switch coupled to the power input port. Each remote subunit also comprises a first power output port configured to be coupled to a second power conductor to provide power from the remote subunit to a second cascaded remote subunit. Each remote subunit also comprises a controller circuit. The controller circuit is configured to detect a first synchronization signal comprising a periodic voltage drop in the power signal and time opening and closing of the switch based on the first synchronization signal. The remote subunit is configured to distribute the received one or more downlink communications signals received from the one or more downlink communications links to one or more client devices. The remote subunit is also configured to distribute the received one or more uplink communications signals from the one or more client devices to the one or more uplink communications links. The DCS also comprises a power distribution system. The power distribution system comprises one or more power distribution circuits. Each of the one or more power distribution circuits comprises a distribution power input configured to receive current distributed by the power source. Each of the one or more power distribution circuits also comprises a distribution power output configured to distribute the received current over a power conductor coupled to an assigned remote unit among the plurality of remote subunits. Each of the one or more power distribution circuits also comprises a distribution switch circuit coupled between the distribution power input and the distribution power output. The distribution switch circuit comprises a distribution switch control input configured to receive a distribution power connection control signal indicating a distribution power connection mode. The distribution switch circuit is configured to be closed to couple the distribution power input to the distribution power output in response to the distribution power connection mode indicating a distribution power connect state. The distribution switch circuit is further configured to be opened to decouple the distribution power input from the distribution power output in response to the distribution power connection mode indicating a distribution power disconnect state. Each of the one or more power distribution circuits also comprises a current measurement circuit coupled to the distribution power output and comprising a current measurement output. The current measurement circuit is configured to measure a current at the distribution power output and generate a current measurement on the current measurement output based on the measured current at the distribution power output. The power distribution system also comprises a controller circuit. The controller circuit comprises one or more current measurement inputs communicatively coupled to the one or more current measurement outputs of the one or more current measurement circuits of the one or more power distribution circuits. The controller circuit is configured to, for a power distribution circuit among the one or more power distribution circuits, generate the distribution power connection control signal indicating the distribution power connection mode to the distribution switch control input of the power distribution circuit indicating the distribution power connect state and determine if the measured current on a current measurement input among the one or more current measurement inputs of the power distribution circuit exceeds a predefined threshold current level. In response to the measured current of the power distribution circuit exceeding the predefined threshold current level, the controller system is configured to communicate the distribution power connection control signal comprising the distribution power connection mode to the distribution switch control input of the power distribution circuit indicating the distribution power disconnect state.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 15 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more power distribution systems, including the power distribution systems in FIGS. 4-11;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include systems and methods for synchronizing subunits in a multi-unit power distribution network. In particular, exemplary aspects of the present disclosure contemplate selectively opening and closing a switch at a power source to disconnect and reconnect the power source to power conductors to send a synchronization signal to one or more remote subunits. Once the remote subunits are synchronized and able to disconnect from the power conductors, leak detection at the power source may be enabled to detect inadvertent loads on the power conductors (e.g., a human touching the power conductors). Further, the remote subunits may power off and on based on the synchronization signal thereby ensuring that an end device may receive power concurrently from multiple remote subunits so as to meet the power requirements of the end device. Enabling the leak detection improves the safety features of the power distribution network and synchronized power delivery to the end device prevents improper shut downs.

A power distribution system rarely exists in isolation. Rather, a power distribution system provides infrastructure to some other system, a few of which are briefly discussed with reference to FIGS. 1-3. A brief discussion of a safety feature for a power distribution network, and the timing thereof is provided with reference to FIGS. 4 and 5. A power distribution network with cascaded remote subunits is provided with reference to FIGS. 6-7. A discussion of exemplary aspects of the present disclosure begins below with reference to FIG. 8.

Figure 1:
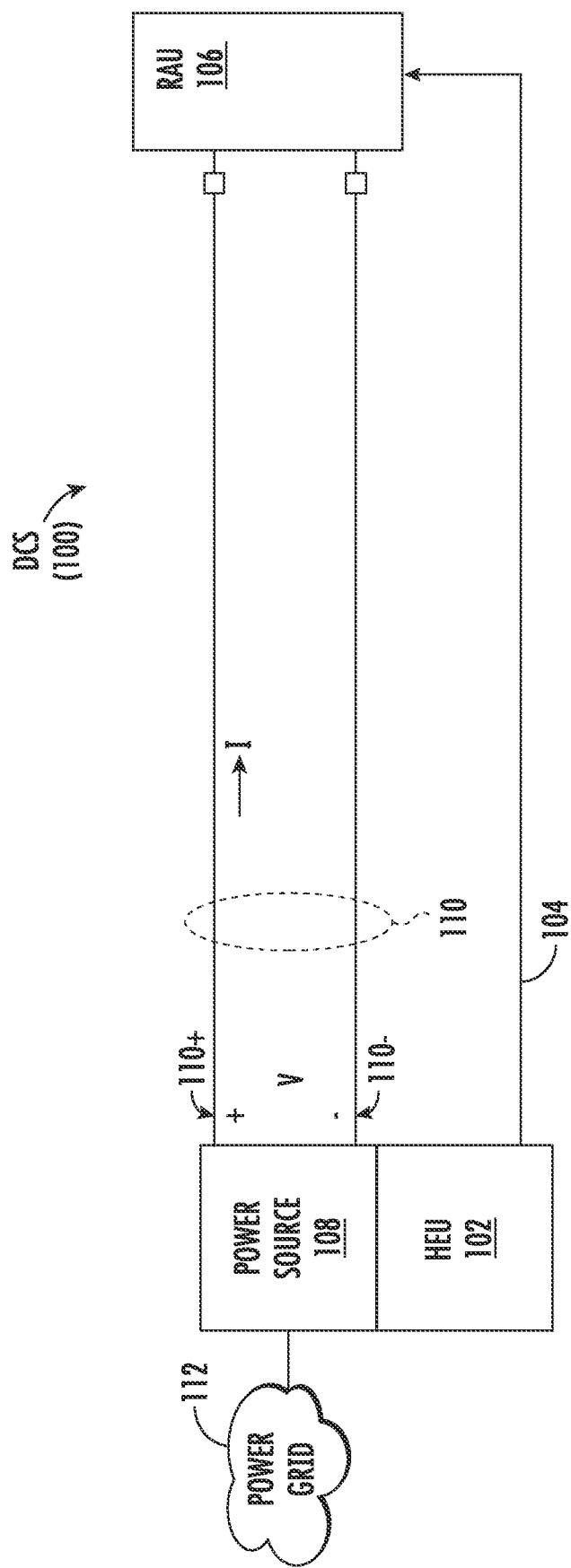
FIG. 1 is a schematic diagram of an exemplary power distribution network for a distributed communication system (DCS), where the power distribution network may have start-up protocols according to exemplary aspects of the present disclosure.

In this regard, FIG. 1 illustrates a simplified block diagram of a distributed communication system (DCS) 100. The DCS 100 may include a head end unit (HEU) 102 that communicates through a communication medium 104 with a remote unit (RU) 106. In the event that the DCS is a Distributed Antenna System (DAS), the RU 106 may be a remote antenna unit (RAU). The communication medium 104 may be a wire-based or optical fiber medium. The RU 106 includes a transceiver and an antenna (not illustrated) that communicate wirelessly with mobile terminals and other user equipment (also not illustrated). Because the RU 106 sends and receives wireless signals and may potentially perform other functions, the RU 106 consumes power. That power may, in some instances, be provided locally. More commonly, and of interest to the present disclosure, the DCS 100 includes a power distribution network, and the RU 106 receives power from a power source 108 that transmits power to the RU 106 over power lines 110 formed from a positive power line 110+ and a negative power line 110−. The power lines 110 may be many meters long, for example, extending through an office building, across multiple floors of a multi-story building, or the like. Further, the power lines 110 may couple to multiple RUs 106 (even though only one is illustrated in FIG. 1). The power source 108 may be coupled to an external power grid 112.

Figure 2:
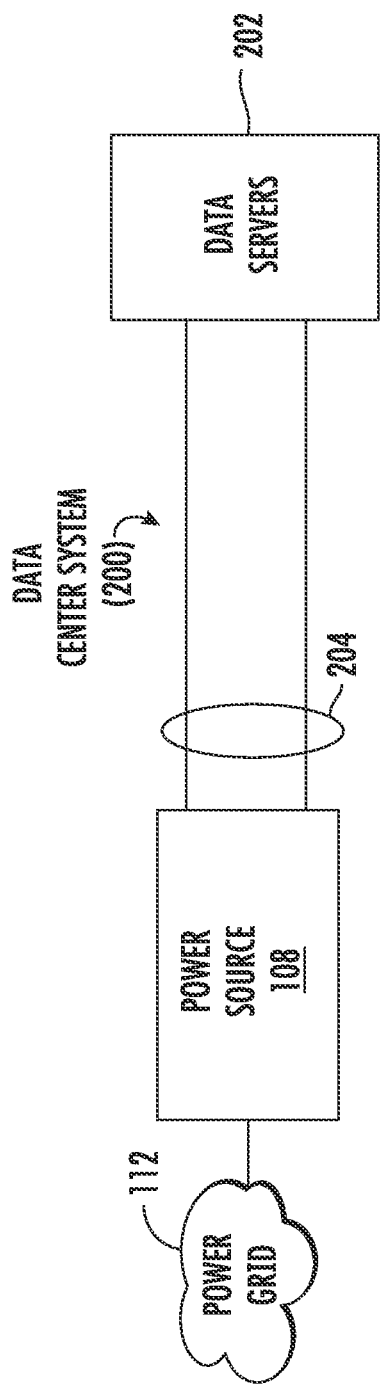
FIG. 2 is a schematic diagram of an exemplary power distribution network for a server farm, where the power distribution network may have start-up protocols according to exemplary aspects of the present disclosure.

Similarly, FIG. 2 illustrates a data center system 200 having a power source 108 coupled to remote data servers 202 through power lines 204. The power source 108 is coupled to the external power grid 112. As with the RU 106, the data servers 202 may consume power supplied through the power lines 204.

Figure 3:
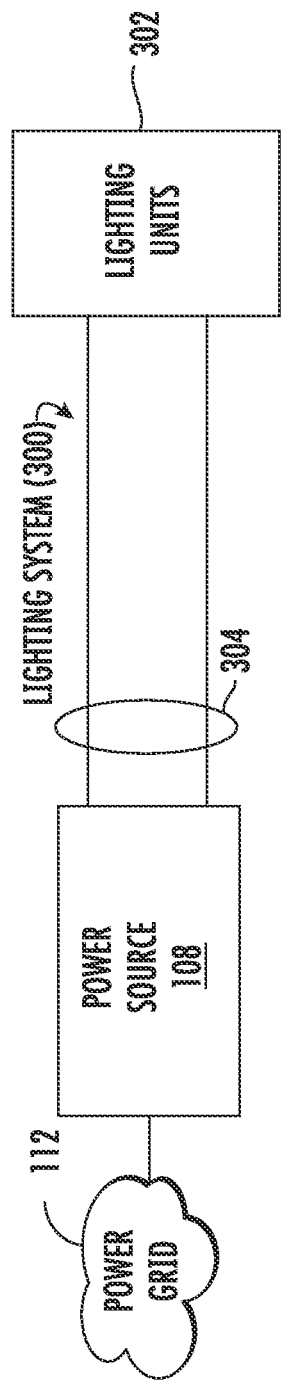
FIG. 3 is a schematic diagram of an exemplary power distribution network for a lighting system, where the power distribution network may have start-up protocols according to exemplary aspects of the present disclosure.

Similarly, FIG. 3 illustrates a lighting system 300 having a power source 108 coupled to remote lighting units 302 through power lines 304. The power source 108 is coupled to the external power grid 112. As with the RU 106, the remote lighting units 302 may consume power supplied through power lines 304.

It should be appreciated that there may be other contexts that may use a power distribution network, and the examples provided in FIGS. 1-3 are not intended to be limiting. As a note of nomenclature, the RU 106, the remote data servers 202, and the remote lighting units 302 are remote subunits in the sense that they are subcomponents within the entirety of the system.

There may be times when it is appropriate to provide a safety feature in a power distribution network. Such safety feature may be used to detect if a human has contacted the power conductors of the power distribution network. While there may be a variety of ways to provide such safety feature, one way that has been proposed is to disconnect a load of the remote subunit from the power conductors and measure current flow on the power conductors. If there is a current flow above a threshold while the load is disconnected, it may be inferred that some other, unintended, load (e.g., a human) is in contact with the power conductors. When such current is detected, a power source may then be disconnected from the power conductors to stop current flow through this other, unintended, load.

Figure 4:
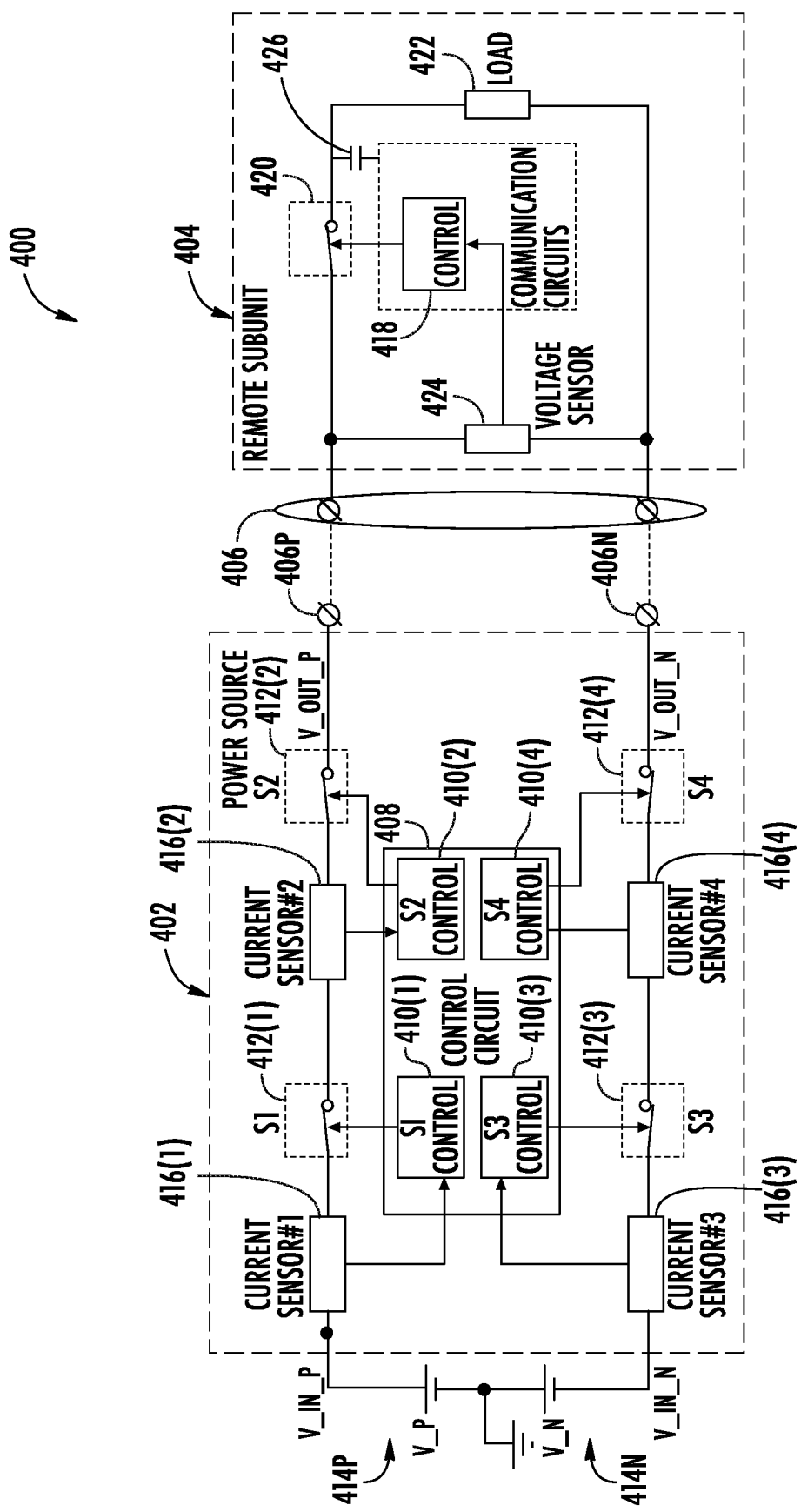
FIG. 4 is a block diagram of a power source and a remote subunit in a power distribution network with disconnect features that may be used to implement safety features.
Figure 5:
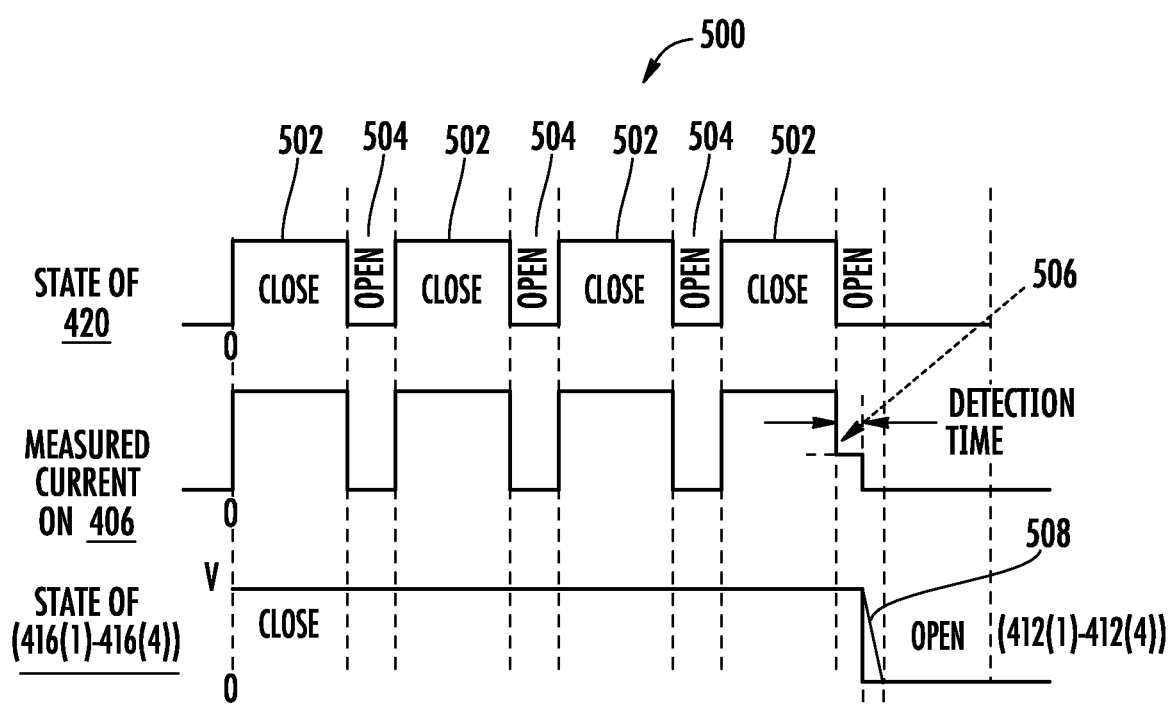
FIG. 5 is a timing diagram showing currents and voltages on power conductors according to the disconnect features of FIG. 4.

In this regard, FIG. 4 provides a block diagram of a power distribution system 400 that provides power from a power source 402 to a remote subunit 404 through power conductors 406. The power conductors 406 may include a positive power conductor 406P and a negative power conductor 406N. The power source 402 may include a control circuit 408 with optional sub circuits 410(1)-410(4) configured to control switches 412(1)-412(4) that connect power supplies 414P and 414N to the power conductors 406P and 406N, respectively. Current sensors 416(1)-416(4) or other current measurement circuits may be provided in the power source 402. The current measurements provided by the current sensors 416(1)-416(4) may be used to detect unsafe operating conditions.

With continued reference to FIG. 4, the remote subunit 404 may include a control circuit 418 that controls a switch 420. The switch 420 may decouple a load 422 from the power conductors 406. A voltage sensor 424 may be provided that monitors the voltage levels on the power conductors 406 and reports the same to the control circuit 418.

Exemplary aspects of the present disclosure use a periodic signal. A signal is a periodic signal if it completes a pattern within a measurable time frame, called a period, and repeats that pattern over identical subsequent periods. The completion of a full pattern is called a cycle. A period is defined as the amount of time (expressed in seconds) required to complete one full cycle.

In operation, the remote subunit 404 opens and closes the switch 420 to decouple the load 422 periodically, thereby interrupting current supplied to the load 422 while leaving the voltage on the power conductors 406 high. A timing diagram 500 is provided in FIG. 5 that illustrates operation of the switch 420 and the corresponding changes in current measured on the power conductors 406. Opening and closing of the switch 420 creates power transfer windows 502 (sometimes referred to as a power transfer period) and power interrupt windows 504 (sometimes referred to as a power interrupt period). Collectively, a single power transfer window 502 and adjacent power interrupt window 504 have a period that is termed herein a "pulse repetition interval" or "PRI." The power source 402 may monitor current on the power conductors 406 with the current sensors 416(1)-416(4) to make sure that the power interrupt windows 504 occur. If current is detected during a power interrupt window 504 (e.g., at 506 in FIG. 5), the control circuit 408 may infer that an unintended external load (such as a human) is touching the power conductor(s) 406 creating an unsafe situation. Accordingly, the control circuit 408 may open one or more of the switches 412(1)-412(4) to lower the voltage on the power conductors 406 as shown at 508 in FIG. 5.

As different remote subunits 404 may have minor differences in the rate with which the switch 420 is activated by the control circuit 418, when there is only one remote subunit 404, the power source 402 may initially synchronize to the timing generated by the remote subunit 404. Exemplary aspects of the present disclosure contemplate plural remote subunits and provide a different synchronization process. In either case, the synchronization process may run in the background and may halt only during data transfers.

It should be appreciated that the load 422 may still need power when the switch 420 is open. Accordingly, a capacitance circuit (e.g., a capacitor) 426 may be provided that is charged while the switch 420 is closed and then used to provide power to the load 422 when the switch 420 is open. As the load 422 may be relatively high energy, the capacitance circuit 426 may be relatively large.

Figure 6:
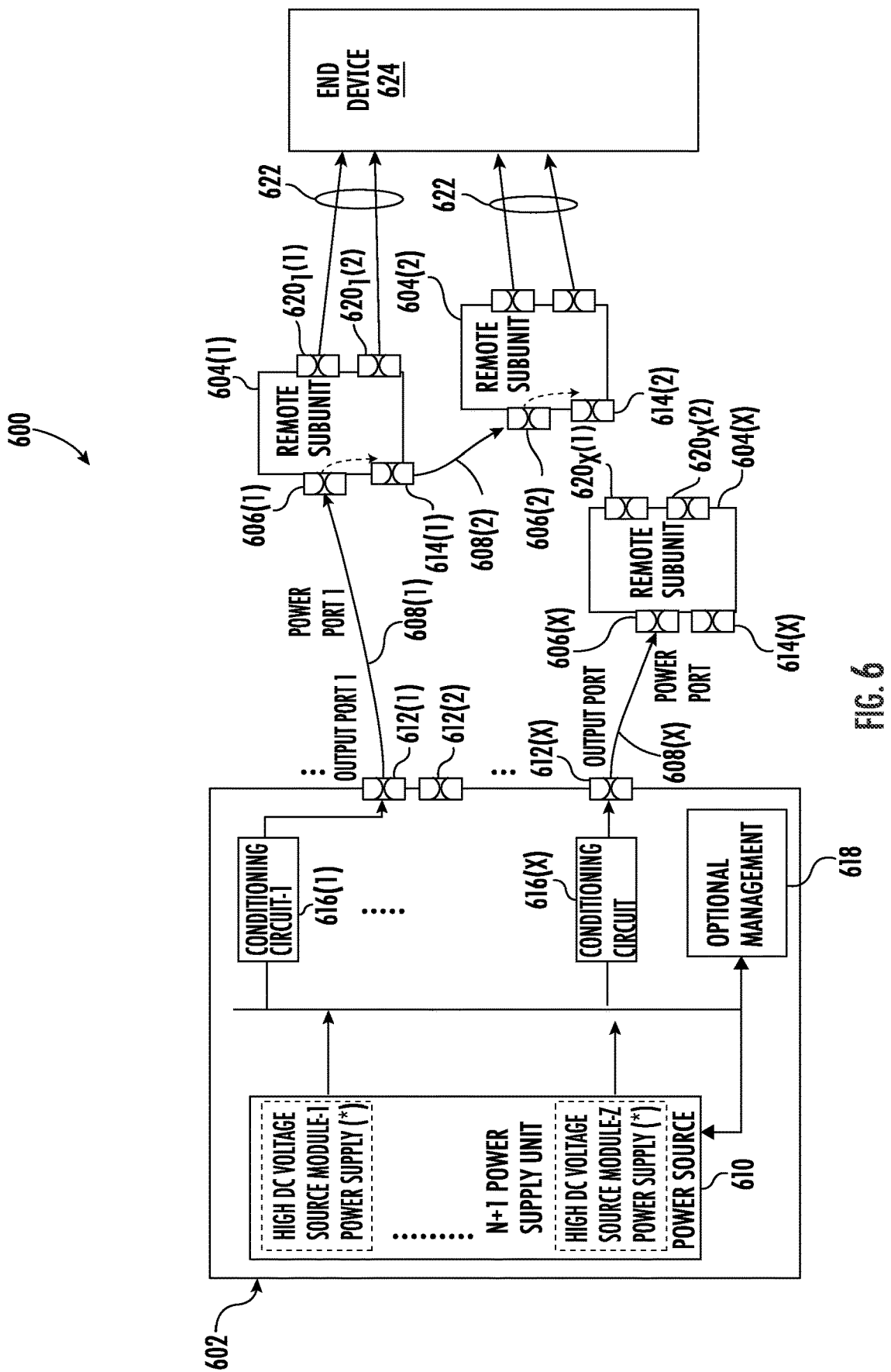
FIG. 6 is a block diagram of a power distribution network having cascaded remote subunits according to an exemplary aspect of the present disclosure.

FIG. 6 is a schematic diagram illustrating a power distribution system 600 with a power distribution circuit 602 configured to distribute power to a plurality of remote subunits 604(1)-604(X). Each remote subunit 604(1)-604(X) includes a remote power input port 606(1)-606(X) coupled to power conductors 608(1)-608(X), respectively, which are configured to be coupled to a power source 610. The power distribution circuit 602 includes a plurality of power output ports 612(1)-612(X) coupled to the respective power conductors 608(1)-608(X). Thus, the power distribution from the power distribution circuit 602 to the remote subunits 604(1)-604(X) is in a point-to-multipoint configuration in this example. The power conductors 608(1)608-(X) are also coupled to the remote power input ports 606(1)-606(X). The remote subunits 604(1)-604(X) may also have remote power output ports 614(1)-614(X) that are configured to carry power from the respective power conductors 608(1)-608(X) received on the remote power input ports 606(1)-606(X) to an extended remote subunit, such as extended remote subunit 604(2). Also, as shown in the power distribution system 600 in FIG. 6, the power distribution circuit 602 may include one or more conditioning circuits 616(1)-616(X) and an optional management circuit 618.

In addition to the power output ports 612(1)-612(X), each remote subunit 604(1)-604(X) may include two (or more) additional power output ports $620_1(1)$, $620_1(2)$-$620_x(1)$, $620_x(2)$. Some portion of the additional power output ports $620_1(1)$, $620_1(2)$-$620_x(1)$, $620_x(2)$ may be coupled to additional power conductors 622. In some power distribution networks, an end device 624 may require more power than is allowed on a single power conductor 622. For example, regulations may limit power on a given power conductor 622 to 100 Watts (W), but the end device 624 may need 400 W. In such an instance, the end device 624 may be coupled to plural power conductors 622 and cumulate power from each to have the total desired power. Continuing the example, and as illustrated, the end device 624 may be coupled to four power conductors 622, each carrying 100 W, so that the end device 624 is conceptually adequately powered. There may be instances when the different remote subunits 604(1), 604(2) turn on and off at different times, resulting in only a portion of the needed power being delivered to the end device 624. This inadequate power delivery may cause the end device 624 to enter a shutdown mode or otherwise operate in a fashion that negatively impacts performance of the end device 624. Exemplary aspects of the present disclosure provide a synchronization signal that causes the additional power output ports $620_1(1)$, $620_1(2)$-$620_x(1)$, $620_x(2)$ to reset and start at the same time so that power is delivered from each power output port $620_1(1)$, $620_1(2)$-$620_x(1)$, $620_x(2)$ concurrently to avoid such inadequate power delivery cases.

Figure 7:
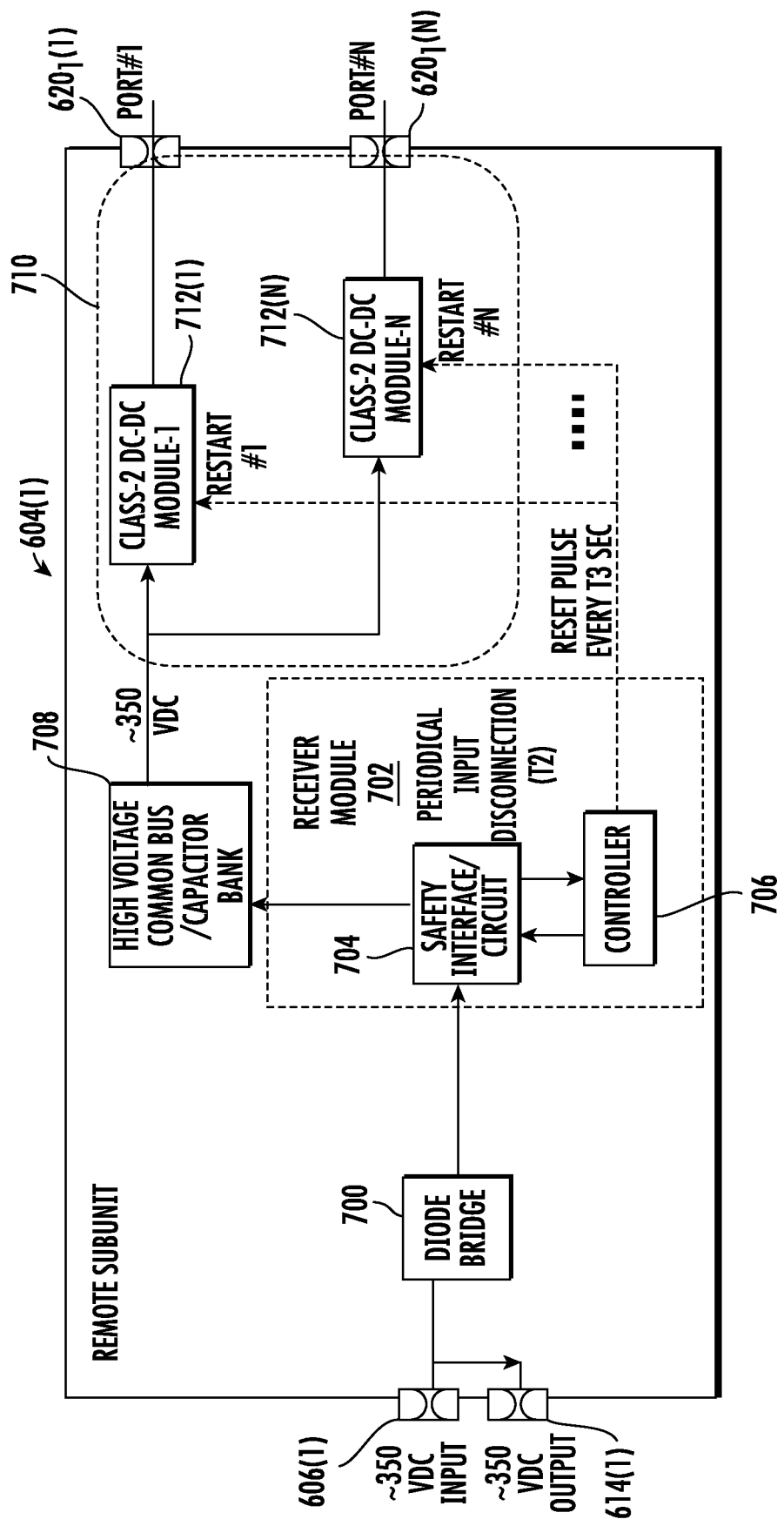
FIG. 7 is a more detailed block diagram of a remote subunit from FIG. 6 that provides power to an end device.

More detail about a remote subunit 604(1) is provided with reference to FIG. 7. In a first exemplary aspect, the remote subunit 604(1) receives power through power input port 606(1) and provides a first power output port 614(1). The power input port 606(1) may be coupled to a diode bridge 700, which in turn may be coupled to a receiver module 702 having a safety interface/circuit 704 and a controller circuit 706 (analogous to the control circuit 418 of FIG. 4). The receiver module 702 may provide a power output to a high voltage common bus or capacitor bank 708, which in turn provides power to an output bank 710, having additional power output ports $620_1(1)$-$620_1(N)$. In an exemplary aspect, each of the additional power output ports $620_1(1)$-$620_1(N)$ has an associated direct current-to-direct current (DC-DC) converter 712(1)-712(N), which may, in an exemplary aspect, be a Class-2 DC-DC converter, such that the power output ports $620_1(1)$-$620_1(N)$ are Class-2 output ports.

In use, the controller circuit 706 may cause a load (e.g., load 422) to disconnect from the power conductor (e.g., power conductor 406 or 608) periodically (i.e., every T2 seconds, where, for example, T2 is equal to four milliseconds (4 ms)). When multiple remote subunits 604 are cascaded (e.g., 604(1) and 604(2)), this disconnect may need to be synchronized. The controller circuit 706 may further send a reset pulse to the DC-DC converters 712(1)-712(N) every T3 seconds, where, for example, T3 is equal to eight seconds (8 s). However, as noted, where multiple remote subunits 604 are providing power to a single end device 624, these reset pulses may need to be synchronized.

Figure 8:
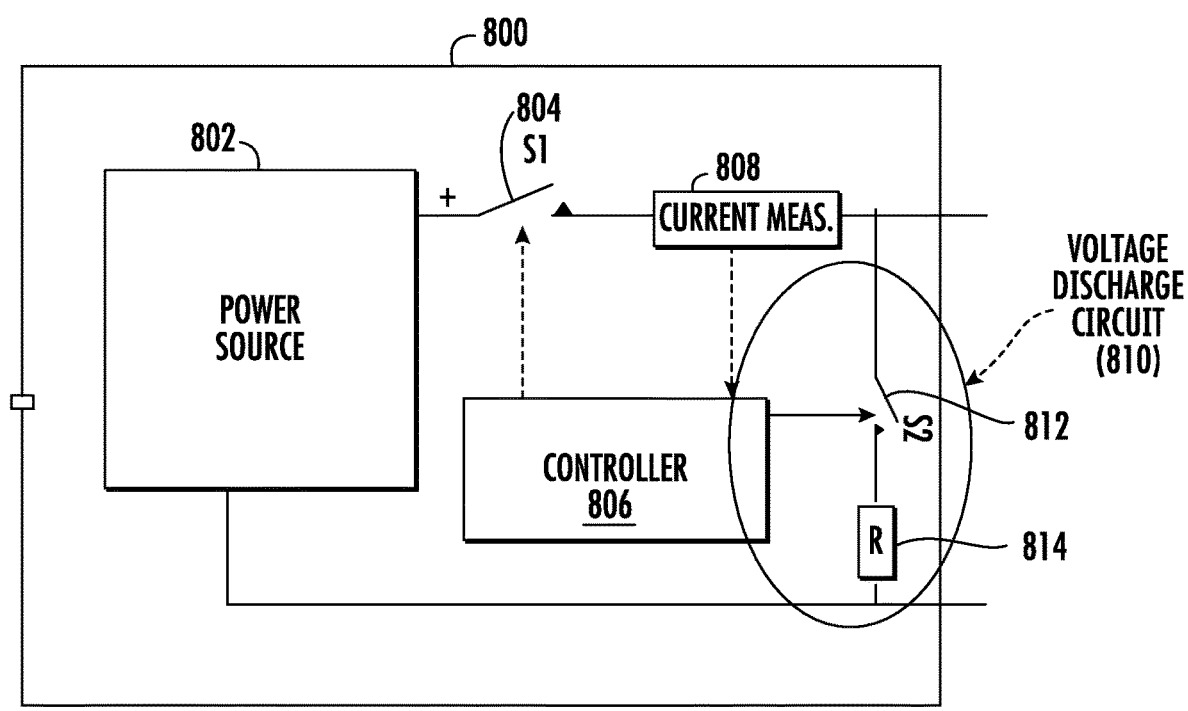
FIG. 8 is a block diagram of a power source for a power distribution network according to an exemplary aspect of the present disclosure.

FIG. 8 illustrates a power source 800 (analogous to power source 402 of FIG. 4 and 602 of FIG. 6). The power source 800 includes a true power source 802, which is coupled to a switch (S1) 804 (which may be any of the switches 412(1)-412(4) of FIG. 4). The switch 804 is controlled by a controller circuit 806. A current sensor 808 (analogous to any of the current sensors 416(1)-416(4)) may be positioned in line with the switch 804. The current sensor 808 may report leakage current to the controller circuit 806 as previously described. The controller circuit 806 also controls a voltage discharge circuit 810, which may include a switch (S2) 812 and a resistor 814. The voltage discharge circuit 810 may be used to drain voltage that is stored in the power conductors through the natural capacitance of the power conductors.

Exemplary aspects of the present disclosure control the switch 804 to open and close periodically to provide a synchronization signal to each remote subunit 604 (or 404) so that the remote subunits 604(1)-604(X) all disconnect at the same time, so that the current sensor 808 can accurately measure leakage current. Likewise, the controller circuit 806 may control the switch 804 to open and close periodically to provide a second synchronization signal to the remote subunits 604(1)-604(X) to reset the DC-DC converters 712(1)-712(N). In this manner, the controller circuit 806 provides synchronization signals which the multiple remote subunits 604 use to operate in such a manner that leakage may be detected accurately and power supplied to the end device 624 as needed.

Figure 9:
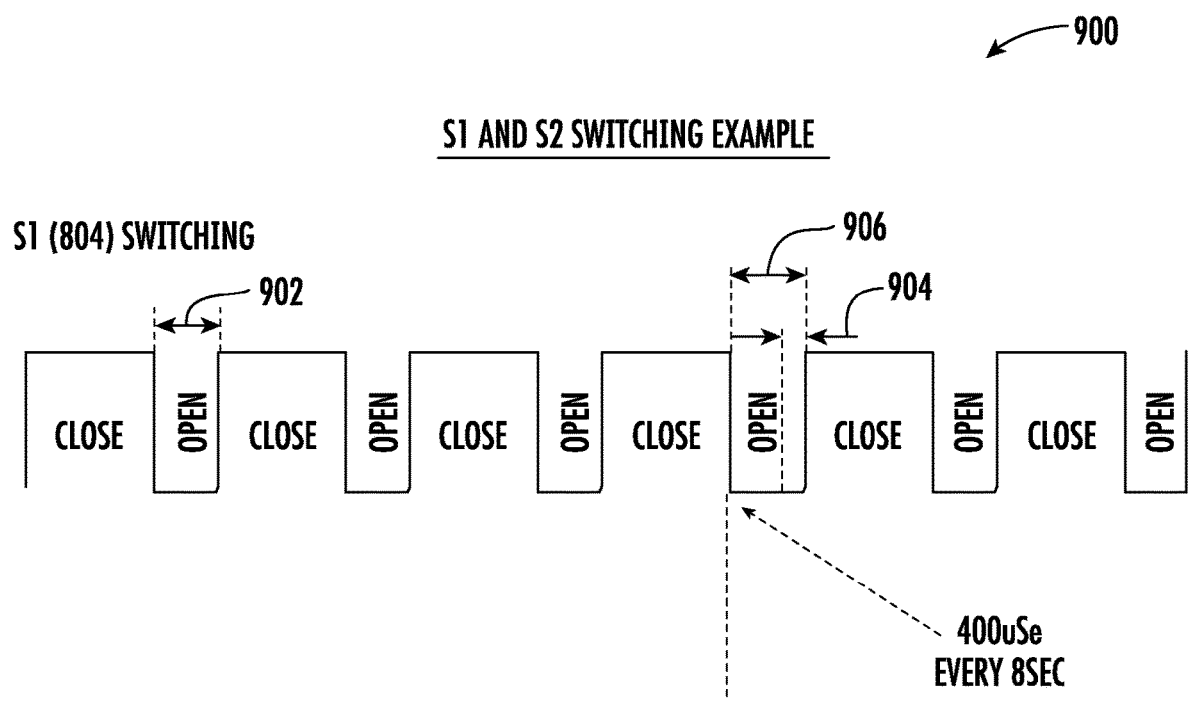
FIG. 9 is a timing diagram showing operation of the switches of the power source of FIG. 8 to create a synchronization signal and decharge power conductors in the power distribution network.

This periodic opening and closing of the switch 804 may be seen in FIG. 9, where a timeline 900 shows that the switch 804 may be opened at a first frequency for a first time 902. In an exemplary aspect, the period for the first frequency may be every 0.5 s and the first time 902 may be around 250 microseconds (μs). The opening for this first frequency is used by the remote subunits 404 to synchronize the opening and closing of the switch 420. The switch 804 may be opened at a second frequency slower than the first frequency for a second time 904. The second time 904 may be contiguous with a first time 902 to form an open time 906. In an exemplary aspect, the second frequency may be every 8 s and the second time 904 may be 150 μs (making the open time 906 about 400 μs).

Note that any of the referenced inputs herein can be provided as input ports or circuits, and any of the referenced outputs herein can be provided as output ports or circuits.

Figure 10:
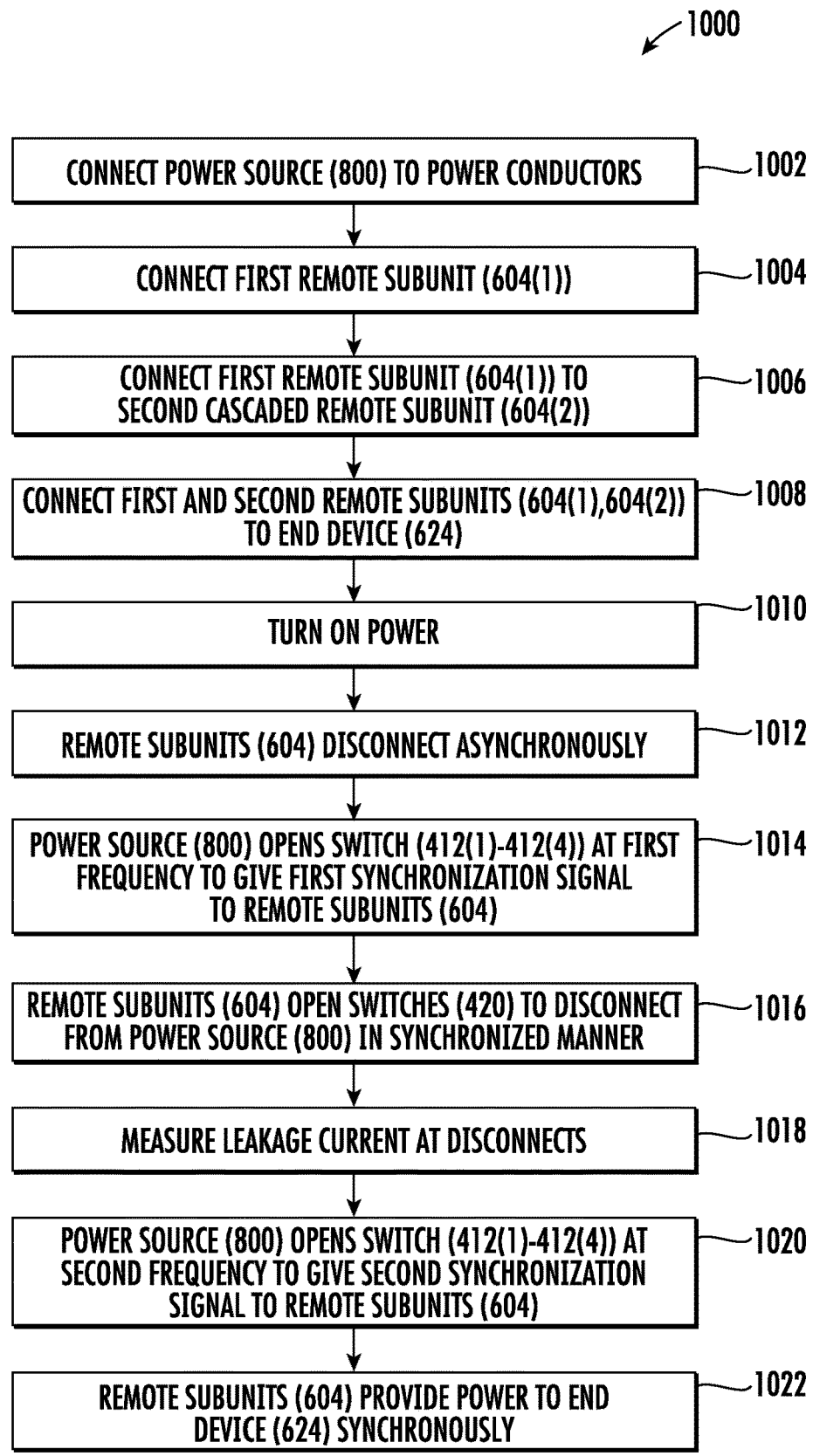
FIG. 10 is a flowchart illustrating an exemplary start up of a remote subunit according to an exemplary process of the present disclosure.

A process 1000 associated with exemplary aspects of the present disclosure is provided in FIG. 10. In particular, the process 1000 begins by connecting a power source (e.g., 402, 602, 800) to power conductors (e.g., 406, 608) (block 1002). The power conductors 608 are connected to a first remote subunit 604(1) (block 1004). The first remote subunit 604(1) is connected to a second cascaded remote subunit 604(2) (block 1006).

With continued reference to FIG. 10, the first and second remote subunits 604(1), 604(2) are connected to an end device 624 (block 1008) and power is turned on at the power source 800 (block 1010). Initially, the remote subunits 604 disconnect from the power conductors 608 asynchronously (block 1012) by opening switches 420 independently of one another. The power source 800 opens a switch (e.g. 412(1)-412(4)) at a first frequency to give a first synchronization signal to the remote subunits 604 (block 1014). The remote subunits 604 open switches 420 to disconnect from the power source 800 in a synchronized manner (block 1016).

With continued reference to FIG. 10, the power source 800 may then measure leakage current during the disconnect windows made by the opening of the switches 420 (block 1018). The power source 800 opens the switch 412(1)-412(4) at a second frequency to give a second synchronization signal to the remote subunits 604 (block 1020). The remote subunits 604 provide power to the end device 624 synchronously (block 1022).

Figure 11:
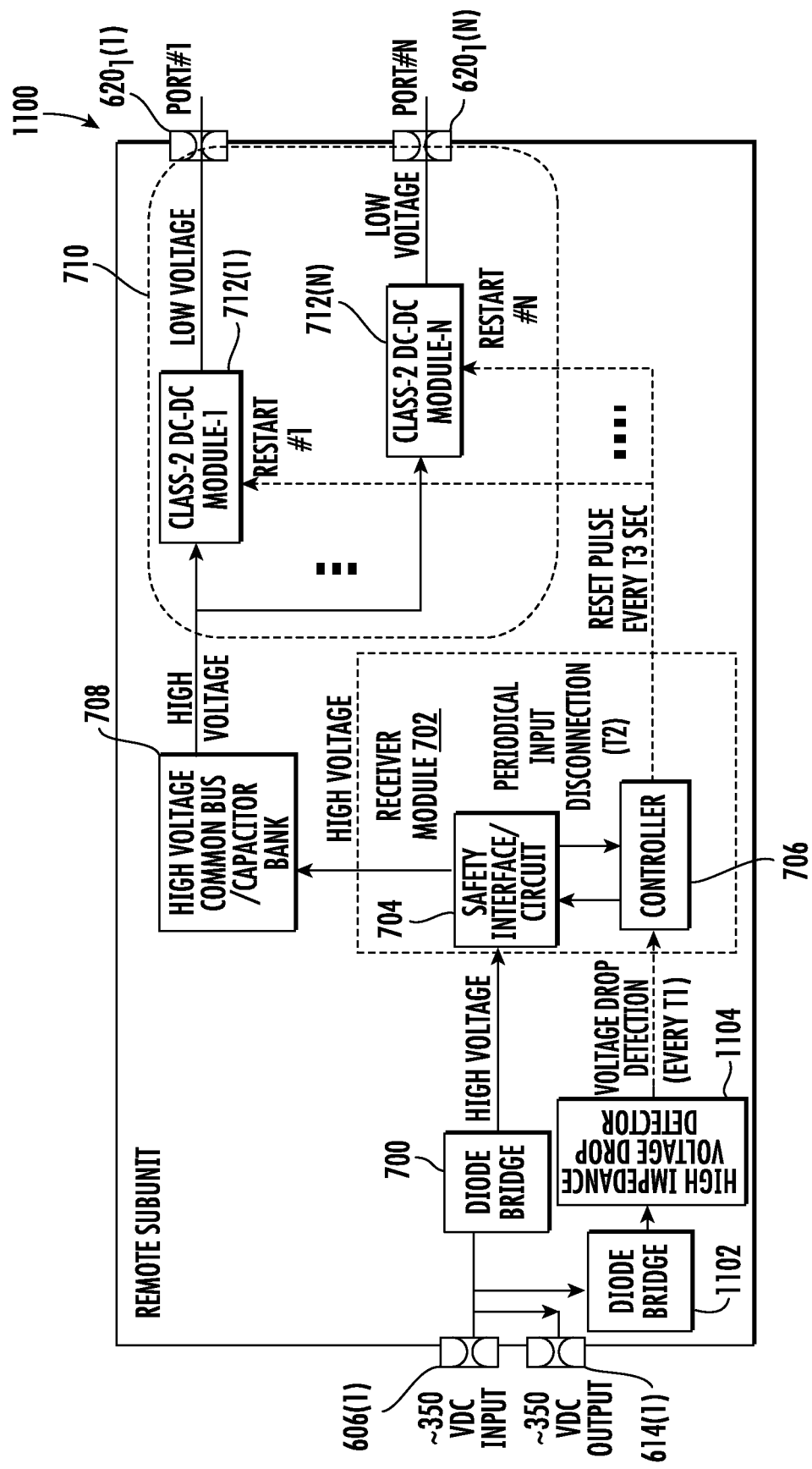
FIG. 11 is a block diagram of the remote subunit of FIG. 7 operating according to an exemplary aspect of the present disclosure.

A more detailed view of the reset function based on the second synchronization signal from the power source 800 may be seen with reference to FIG. 11. A remote subunit 1100 is similar to the remote subunit 604(1), but has an additional diode bridge 1102 that is coupled to the power input port 606(1) and to a high impedance voltage drop detector circuit 1104. The voltage drop detector circuit 1104 detects when the power source 800 has opened a switch 412 because the voltage on the power conductor 608(1) drops. Based on this detection, the voltage drop detector circuit 1104 signals the controller circuit 706 that the power source 800 has sent a synchronization signal. Pulse width modulation of the voltage drop may alert the controller circuit 706 whether this is the first synchronization signal, the second synchronization signal, or some other form of signaling. The additional diode bridge 1102 is present to ensure that the existing receiver module 702 does not impact the voltage drop measurement.

As noted above in the discussion of FIG. 4, there may be a capacitance circuit 426 present in the remote subunit 404 (and, while not shown, in the remote subunits 604(1)-604(X)). As further noted, the capacitance circuit 426 may be relatively large and take some amount of time to charge initially. While the capacitance circuit 426 is charging, there may be insufficient power available to open and close the switch 420, which may be treated as a fault condition (i.e., a human is contacting the power conductors 406) by the control circuit 408 because the current sensors 416(1)-416(4) may detect current on the power conductors 406 when a power interrupt window 504 is expected. This fault condition may result in a false alarm coupled with safety-driven interrupts by the switches 412(1)-412(4). When there are cascaded remote subunits 604 as shown in FIG. 6 (e.g., remote subunit 604(2) is cascaded off remote subunit 604(1)), the interior capacitance circuits 426 may need to charge in each of the remote subunits 604 before a power interrupt window 504 may be created. Given the size of the capacitance circuits 426, this may take commercially unacceptably long times (e.g., in excess of a minute). The controller circuit 706 may include a free run oscillator (not shown) having about a 50-100 parts per million crystal oscillator to have limited drift. Alternatively, the controller circuit 706 may include a phase locked loop (PLL). The synchronization circuit may be based on a simple logic circuit or alternatively in software as needed or desired.

Figure 16:
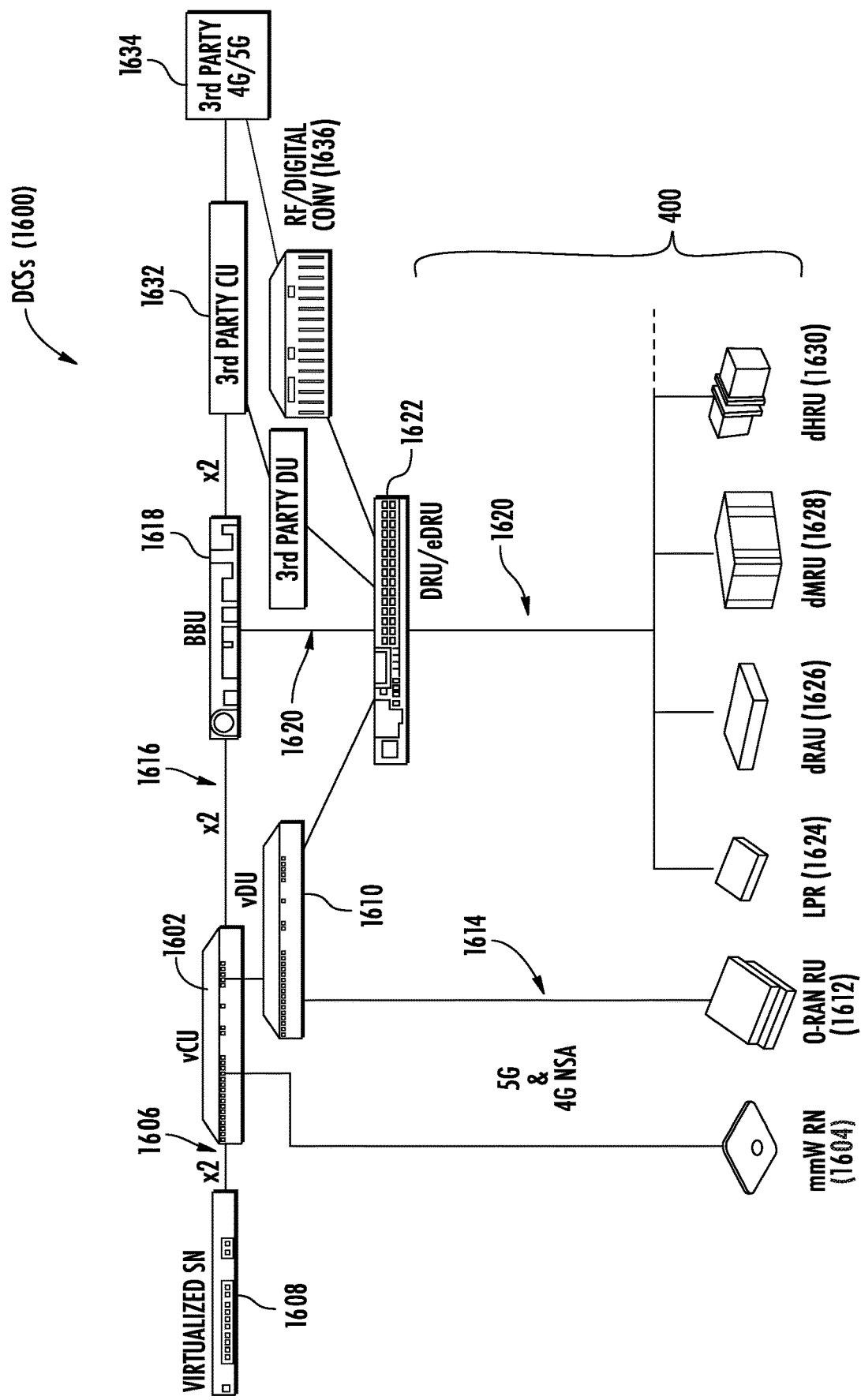
FIG. 16 is a schematic diagram an exemplary DCS that supports 4G and 5G communications services, and that can include one or more power distribution systems, including the power distribution systems in FIGS. 4-11.
Figure 17:
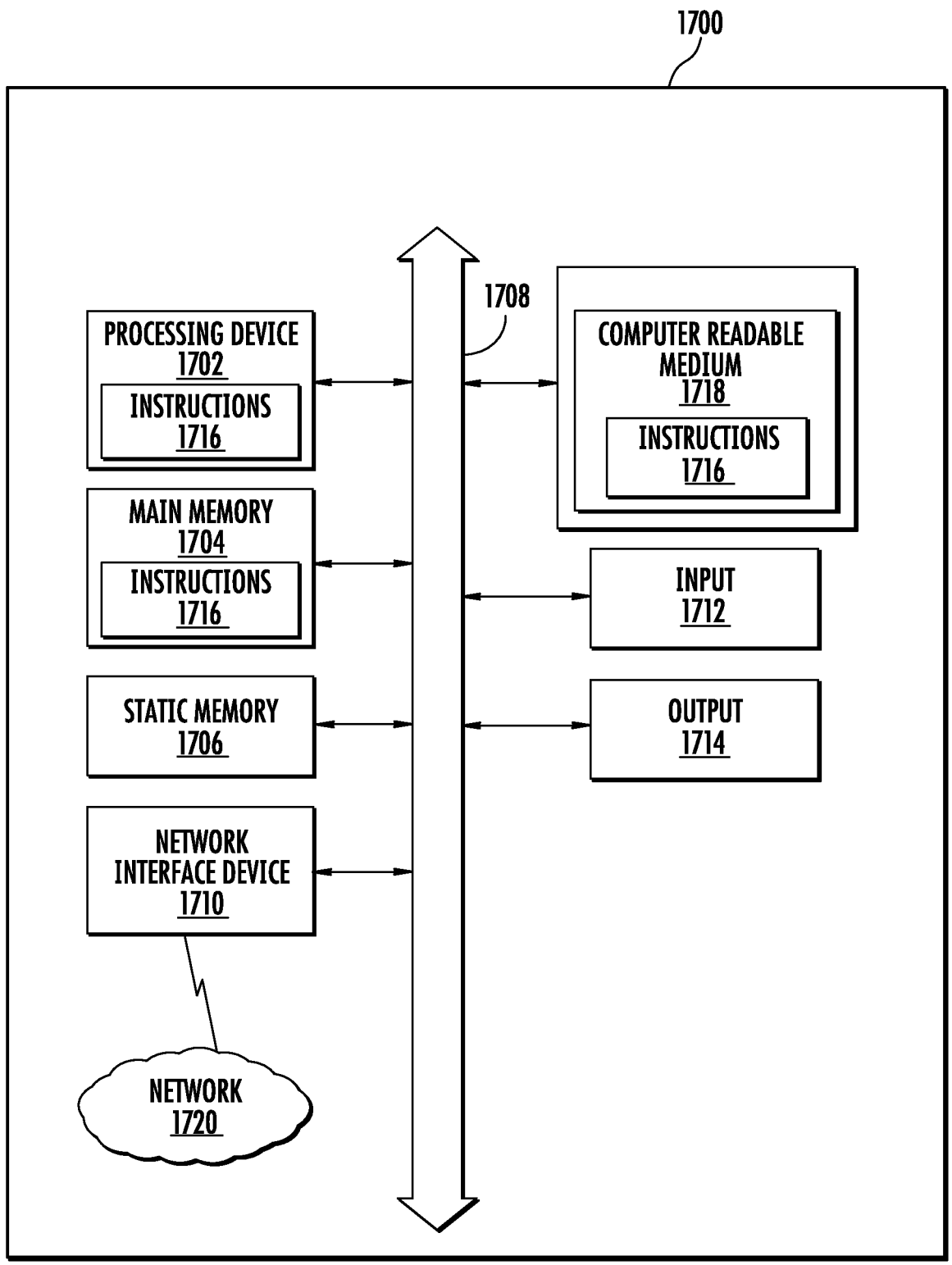
FIG. 17 is a schematic diagram of a generalized representation of an exemplary controller that can be included in any component or circuit in a power distribution system, including the power distribution systems in FIGS. 1-16, wherein an exemplary computer system is adapted to execute instructions from an exemplary computer-readable link.

In the interests of completeness, one exemplary DCS having a power distribution network is explored below with reference to FIGS. 12-16 and an exemplary computer that may be used at various locations within a power distribution network is illustrated in FIG. 17. It should be appreciated that the precise context for the power distribution network is not central to the present disclosure.

Figure 12:
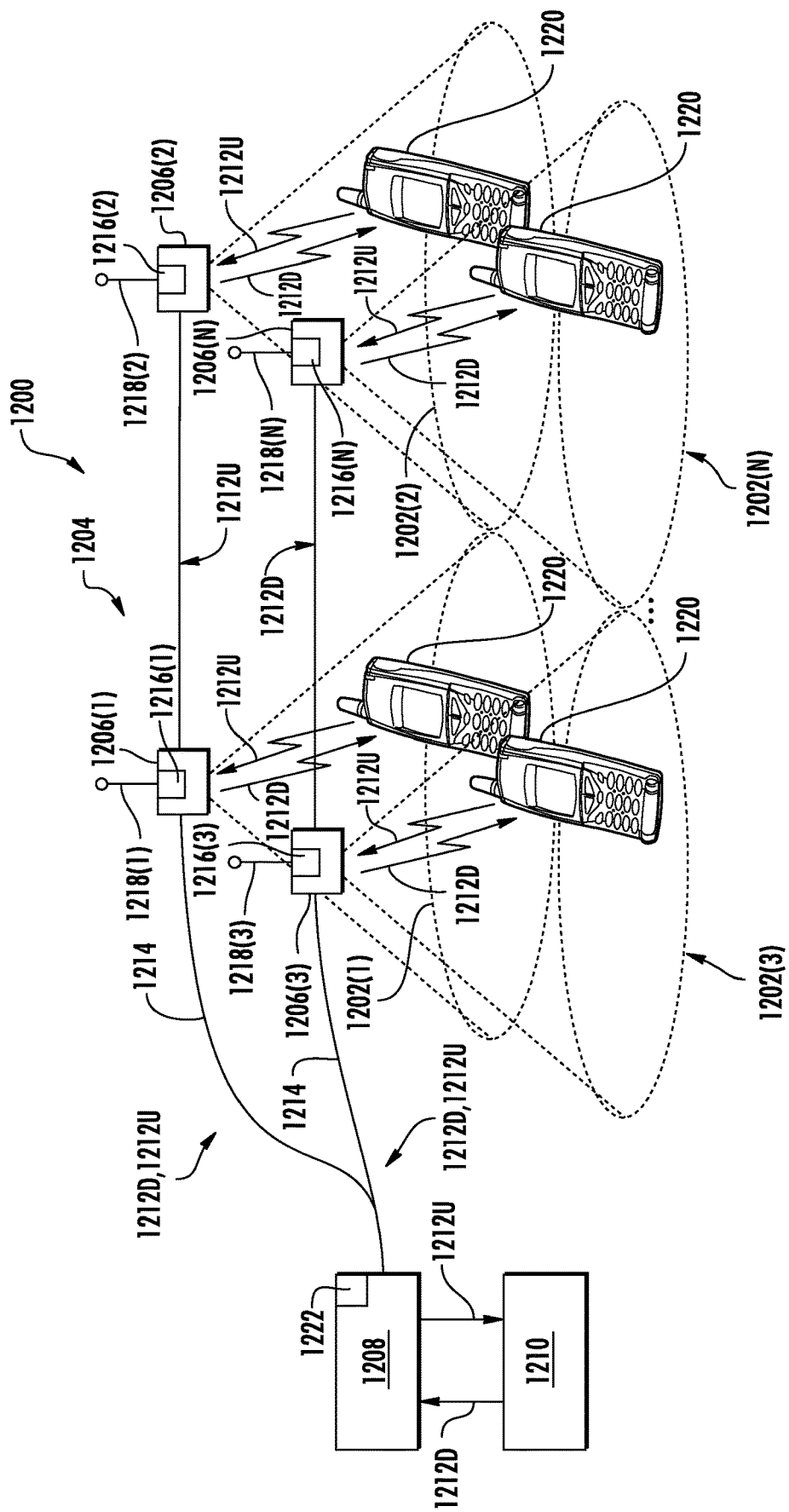
FIG. 12 is a schematic diagram of an exemplary DCS configured to distribute communications signals between a central unit and a plurality of remote subunits, and that can include one or more power distribution systems, including the power distribution systems in FIGS. 1-11.

In this regard, FIG. 12 illustrates a wireless distributed communications system (WDCS) 1200 that is configured to distribute communications services to remote coverage areas 1202(1)-1202(N), where 'N' is the number of remote coverage areas. The WDCS 1200 in FIG. 12 is provided in the form of a DAS 1204. The DAS 1204 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 1202(1)-1202(N) are created by and centered on remote units 1206(1)-1206(N) connected to a central unit 1208 (e.g., a head-end controller, a central unit, or a head-end unit). The central unit 1208 may be communicatively coupled to a source transceiver 1210, such as for example, a base transceiver station (BTS) or a baseband unit (BBU). In this regard, the central unit 1208 receives downlink communications signals 1212D from the source transceiver 1210 to be distributed to the remote units 1206(1)-1206(N). The downlink communications signals 1212D can include data communications signals and/or communication signaling signals, as examples. The central unit 1208 is configured with filtering circuits and/or other signal processing circuits that are configured to support a specific number of communications services in a particular frequency bandwidth (i.e., frequency communications bands). The downlink communications signals 1212D are communicated by the central unit 1208 over a communications link 1214 over their frequency to the remote units 1206(1)-1206(N).

With continuing reference to FIG. 12, the remote units 1206(1)-1206(N) are configured to receive the downlink communications signals 1212D from the central unit 1208 over the communications link 1214. The downlink communications signals 1212D are configured to be distributed to the respective remote coverage areas 1202(1)-1202(N) of the remote units 1206(1)-1206(N). The remote units 1206(1)-1206(N) are also configured with filters and other signal processing circuits that are configured to support all or a subset of the specific communications services (i.e., frequency communications bands) supported by the central unit 1208. In a non-limiting example, the communications link 1214 may be a wired communications link, a wireless communications link, or an optical fiber-based communications link. Each of the remote units 1206(1)-1206(N) may include an RF transmitter/receiver 1216(1)-1216(N) and a respective antenna 1218(1)-1218(N) operably connected to the RF transmitter/receiver 1216(1)-1216(N) to wirelessly distribute the communications services to user equipment (UE) 1220 within the respective remote coverage areas 1202(1)-1202(N). The remote units 1206(1)-1206(N) are also configured to receive uplink communications signals 1212U from the UE 1220 in the respective remote coverage areas 1202(1)-1202(N) to be distributed to the source transceiver 1210.

Because the remote units 1206(1)-1206(N) include components that require power to operate, such as the RF transmitter/receivers 1216(1)-1216(N) for example, it is necessary to provide power to the remote units 1206(1)-1206(N). In one example, each remote unit 1206(1)-1206(N) may receive power from a local power source. In another example, the remote units 1206(1)-1206(N) may be powered remotely from a remote power source(s). For example, the central unit 1208 may include a power source 1222 that is configured to remotely supply power over the communications links 1214 to the remote units 1206(1)-1206(N). For example, the communications links 1214 may be cables that include electrical conductors for carrying current (e.g., direct current (DC)) to the remote units 1206(1)-1206(N). If the WDCS 1200 is an optical fiber-based WDCS in which the communications links 1214 include optical fibers, the communications links 1214 may be "hybrid" cables that include optical fibers for carrying the downlink and uplink communications signals 1212D, 1212U and separate electrical conductors for carrying current to the remote units 1206(1)-1206(N).

Some regulations, such as IEC 60950-21, may limit the amount of direct current (DC) that is remote delivered by the power source 1222 over the communications links 1214 to less than the amount needed to power the remote units 1206(1)-1206(N) during peak power consumption periods for safety reasons, such as in the event a human contacts the wire. One solution to remote power distribution limitations is to employ multiple conductors and split current from the power source 1222 over the multiple conductors, such that the current on any one electrical conductor is below the regulated limit. Another solution includes delivering remote power at a higher voltage so that a lower current can be distributed at the same power level. For example, assume that 300 W of power is to be supplied to a remote unit 1206(1)-1206(N) by the power source 1222 through a communications link 1214. If the voltage of the power source 1222 is 60 Volts (V), the current will be 5 Amperes (A) (i.e., 300 W/60 V). However, if a 400 Volt power source 1222 is used, then the current flowing through the wires will be 0.75 A. However, delivering high voltage through electrical conductors may be further regulated to prevent an undesired current from flowing through a human in the event that a human contacts the electrical conductor. Thus, these safety measures may require other protections, such as the use of protection conduits, which may make installations more difficult and add cost.

Figure 13:
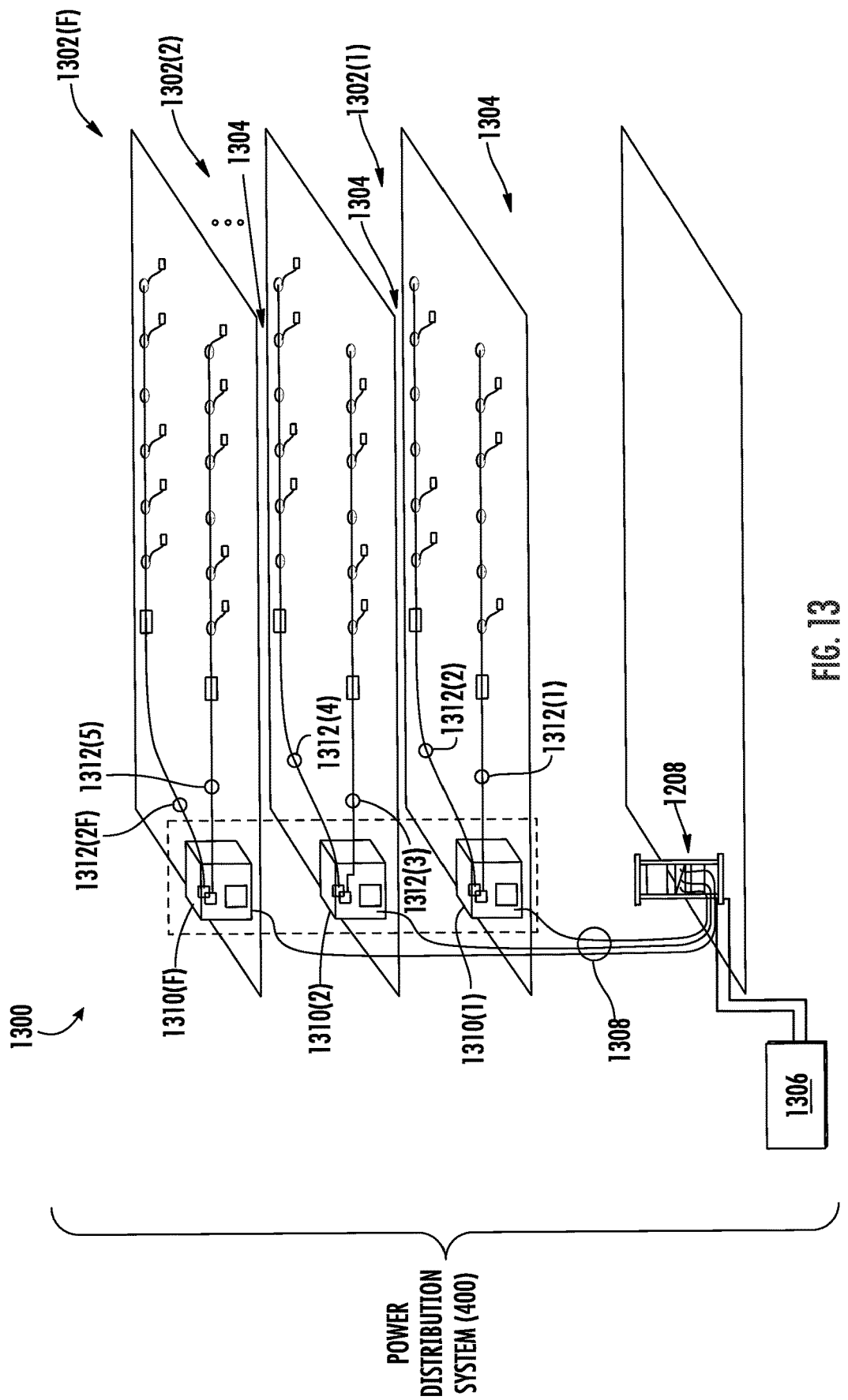
FIG. 13 is a partially schematic cut-away diagram of an exemplary building infrastructure in which the DCS in FIG. 12 can be provided.

The DAS 1204 and its power distribution system 400 can be provided in an indoor environment as illustrated in FIG. 13. FIG. 13 is a partially schematic cut-away diagram of a building infrastructure 1300 employing the power distribution system 400. The building infrastructure 1300 in this embodiment includes a first (ground) floor 1302(1), a second floor 1302(2), and an Fth floor 1302(F), where 'F' can represent any number of floors. The floors 1302(1)-1302(F) are serviced by the central unit 1208 to provide antenna coverage areas 1304 in the building infrastructure 1300. The central unit 1208 is communicatively coupled to a signal source 1306, such as a BTS or BBU, to receive the downlink electrical communications signals. The central unit 1208 is communicatively coupled to the remote subunits to receive uplink optical communications signals from the remote subunits. The downlink and uplink optical communications signals are distributed between the central unit 1208 and the remote subunits over a riser cable 1308 in this example. The riser cable 1308 may be routed through interconnect units (ICUs) 1310(1)-1310(F) dedicated to each floor 1302(1)-1302(F) for routing the downlink and uplink optical communications signals to the remote subunits. The ICUs 1310(1)-1310(F) may also include respective power distribution circuits that include power sources as part of the power distribution system 400, wherein the power distribution circuits are configured to distribute power remotely to the remote subunits to provide power for operating the power-consuming components in the remote subunits. For example, array cables 1312(1)-1312(2F) may be provided and coupled between the ICUs 1310(1)-1310(F) that contain both optical fibers to provide the respective downlink and uplink optical fiber communications media and power conductors (e.g., electrical wire) to carry current from the respective power distribution circuits to the remote subunits.

Figure 14:
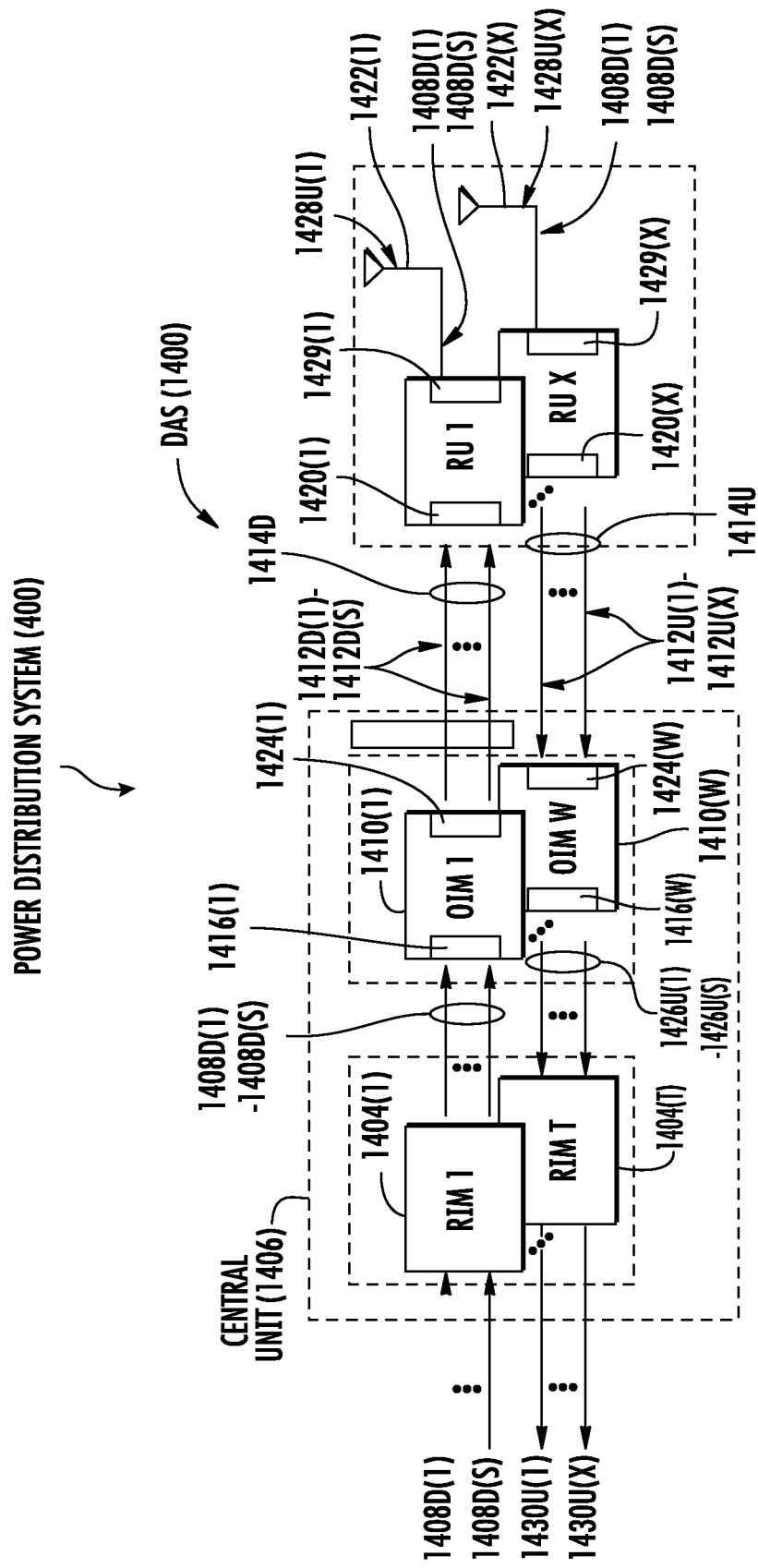
FIG. 14 is a schematic diagram of an exemplary optical fiber-based DCS comparable to the DCS of FIG. 12 configured to distribute communications signals between a central unit and a plurality of remote subunits, and that can include one or more power distribution systems, including the power distribution systems in FIGS. 1-11.
Figure 5:
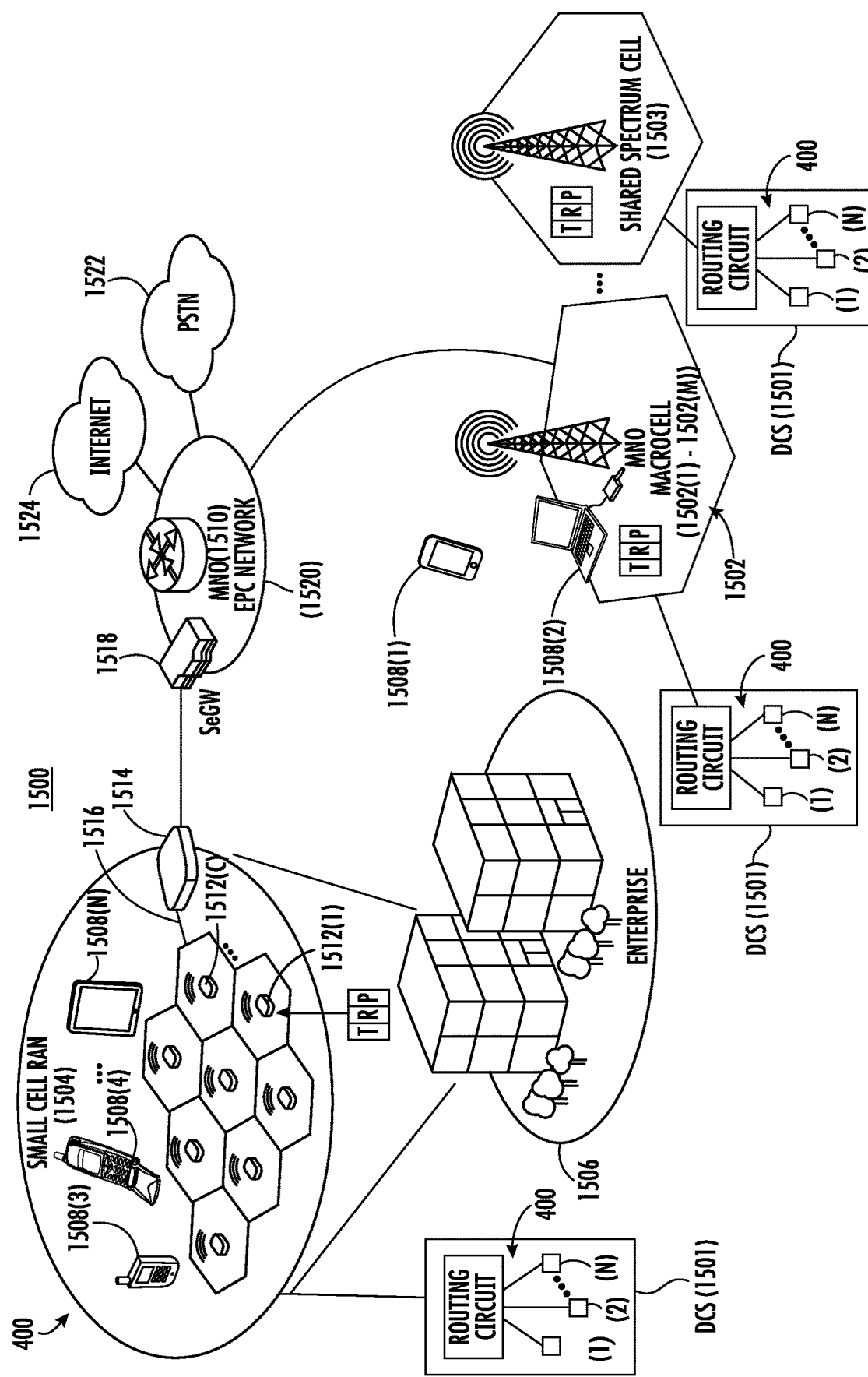

FIG. 14 is a schematic diagram of an exemplary optical fiber-based distributed antenna system (DAS) 1400 in which a power distribution system can be provided. In this example, the power distribution system 400 is provided in a DCS which is the DAS 1400 in this example. Note that the power distribution system 400 is not limited to being provided in a DCS. A DAS is a system that is configured to distribute communications signals, including wireless communications signals, from a central unit to a plurality of remote subunits over physical communications media, to then be distributed from the remote subunits wirelessly to client devices in wireless communication range of a remote unit. The DAS 1400 in this example is an optical fiber-based DAS that is comprised of three (3) main components. One or more radio interface circuits provided in the form of radio interface modules (RIMs) 1404(1)-1404(T) are provided in a central unit 1406 to receive and process downlink electrical communications signals 1408D(1)-1408D(S) prior to optical conversion into downlink optical communications signals. The downlink electrical communications signals 1408D(1)-1408D(S) may be received from a base transceiver station (BTS) or baseband unit (BBU) as examples. The downlink electrical communications signals 1408D(1)-1408D(S) may be analog signals or digital signals that can be sampled and processed as digital information. The RIMs 1404(1)-1404(T) provide both downlink and uplink interfaces for signal processing. The notations "1-S" and "1-T" indicate that any number of the referenced component, 1-S and 1-T, respectively, may be provided.

With continuing reference to FIG. 14, the central unit 1406 is configured to accept the plurality of RIMs 1404(1)-1404(T) as modular components that can easily be installed and removed or replaced in a chassis. In one embodiment, the central unit 1406 is configured to support up to twelve (12) RIMs 1404(1)-1404(12). Each RIM 1404(1)-1404(T) can be designed to support a particular type of radio source or range of radio sources (i.e., frequencies) to provide flexibility in configuring the central unit 1406 and the DAS 1400 to support the desired radio sources. For example, one RIM 1404(1)-1404(T) may be configured to support the Personal Communication Services (PCS) radio band. Another RIM 1404(1)-1404(T) may be configured to support the 700 MHz radio band. In this example, by inclusion of these RIMs 1404(1)-1404(T), the central unit 1406 could be configured to support and distribute communications signals, including those for the communications services and communications bands described above as examples.

The RIMs 1404(1)-1404(T) may be provided in the central unit 1406 that support any frequencies desired, including, but not limited to, licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 14, the received downlink electrical communications signals 1408D(1)-1408D(S) are provided to a plurality of optical interfaces provided in the form of optical interface modules (OIMs) 1410(1)-1410(W) in this embodiment to convert the downlink electrical communications signals 1408D(1)-1408D(S) into downlink optical communications signals 1412D(1)-1412D(S). The notation "1-W" indicates that any number of the referenced component 1-W may be provided. The OIMs 1410(1)-1410(W) may include one or more optical interface components (OICs) that contain electrical-to-optical (E-O) converters 1416(1)-1416(W) to convert the received downlink electrical communications signals 1408D(1)-1408D(S) into the downlink optical communications signals 1412D(1)-1412D(S). The OIMs 1410(1)-1410(W) support the radio bands that can be provided by the RIMs 1404(1)-1404(T), including the examples previously described above. The downlink optical communications signals 1412D(1)-1412D(S) are communicated over a downlink optical fiber communications link 1414D to a plurality of remote subunits (e.g., remote subunits 604). The notation "1-X" indicates that any number of the referenced component 1-X may be provided. One or more of the downlink optical communications signals 1412D(1)-1412D(S) can be distributed to each remote subunit. Thus, the distribution of the downlink optical communications signals 1412D(1)-1412D(S) from the central unit 1406 to the remote subunits is in a point-to-multipoint configuration in this example.

With continuing reference to FIG. 14, the remote subunits include optical-to-electrical (O-E) converters 1420(1)-1420(X) configured to convert the one or more received downlink optical communications signals 1412D(1)-1412D(S) back into the downlink electrical communications signals 1408D(1)-1408D(S) to be wirelessly radiated through antennas 1422(1)-1422(X) in the remote subunits to user equipment (not shown) in the reception range of the antennas 1422(1)-1422(X). The OIMs 1410(1)-1410(W) may also include O-E converters 1424(1)-1424(W) to convert received uplink optical communications signals 1412U(1)-1412U(X) from the remote subunits into uplink electrical communications signals 1426U(1)-1426U(S) as will be described in more detail below.

With continuing reference to FIG. 14, the remote subunits are also configured to receive uplink electrical communications signals 1428U(1)-1428U(X) received by the respective antennas 1422(1)-1422(X) from client devices in wireless communication range of the remote subunits. The uplink electrical communications signals 1428U(1)-1428U(S) may be analog signals or digital signals that can be sampled and processed as digital information. The remote subunits include E-O converters 1429(1)-1429(X) to convert the received uplink electrical communications signals 1428U(1)-1428U(X) into uplink optical communications signals 1412U(1)-1412U(X). The remote subunits distribute the uplink optical communications signals 1412U(1)-1412U(X) over an uplink optical fiber communications link 1414U to the OIMs 1410(1)-1410(W) in the central unit 1406. The O-E converters 1424(1)-1424(W) convert the received uplink optical communications signals 1412U(1)-1412U(X) into uplink electrical communications signals 1430U(1)-1430U(X), which are processed by the RIMs 1404(1)-1404(T) and provided as the uplink electrical communications signals 1430U(1)-1430U(X) to a source transceiver such as a BTS or BBU.

Note that the downlink optical fiber communications link 1414D and the uplink optical fiber communications link 1414U coupled between the central unit 1406 and the remote subunits may be a common optical fiber communications link, wherein for example, wave division multiplexing (WDM) may be employed to carry the downlink optical communications signals 1412D(1)-1412D(S) and the uplink optical communications signals 1412U(1)-1412U(X) on the same optical fiber communications link. Alternatively, the downlink optical fiber communications link 1414D and the uplink optical fiber communications link 1414U coupled between the central unit 1406 and the remote subunits may be single, separate optical fiber communications links, wherein for example, wave division multiplexing (WDM) may be employed to carry the downlink optical communications signals 1412D(1)-1412D(S) on one common downlink optical fiber and the uplink optical communications signals 1412U(1)-1412U(X) on a separate, only uplink optical fiber. Alternatively, the downlink optical fiber communications link 1414D and the uplink optical fiber communications link 1414U coupled between the central unit 1406 and the remote subunits may be separate optical fibers dedicated to and providing a separate communications link between the central unit 1406 and each remote subunit.

FIG. 15 is a schematic diagram of an exemplary mobile telecommunications environment 1500 that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more power distribution systems, including the power distribution system 400. The environment 1500 includes exemplary macrocell RANs 1502(1)-1502(M) ("macrocells 1502(1)-1502(M)") and an exemplary small cell RAN 1504 located within an enterprise environment 1506 and configured to service mobile communications between a user mobile communications device 1508(1)-1508(N) to an MNO 1510. A serving RAN for a user mobile communications device 1508(1)-1508(N) is a RAN or cell in the RAN in which the user mobile communications devices 1508(1)-1508(N) have an established communications session with the exchange of mobile communications signals for mobile communications. Thus, a serving RAN may also be referred to herein as a serving cell. For example, the user mobile communications devices 1508(3)-1508(N) in FIG. 15 are being serviced by the small cell RAN 1504, whereas user mobile communications devices 1508(1) and 1508(2) are being serviced by the macrocell 1502. The macrocell 1502 is an MNO macrocell in this example. However, a shared spectrum RAN 1503 (also referred to as "shared spectrum cell 1503") includes a macrocell in this example and supports communications on frequencies that are not solely licensed to a particular MNO and thus may service user mobile communications devices 1508(1)-1508(N) independent of a particular MNO. For example, the shared spectrum cell 1503 may be operated by a third party that is not an MNO and wherein the shared spectrum cell 1503 supports Citizen Broadband Radio Service (CBRS). Also, as shown in FIG. 15, the MNO macrocell 1502, the shared spectrum cell 1503, and/or the small cell RAN 1504 can interface with a shared spectrum DCS 1501 supporting coordination of distribution of shared spectrum from multiple service providers to remote subunits to be distributed to subscriber devices. The MNO macrocell 1502, the shared spectrum cell 1503, and the small cell RAN 1504 may be neighboring radio access systems to each other, meaning that some or all can be in proximity to each other such that a user mobile communications device 1508(1)-1508(N) may be able to be in communications range of two or more of the MNO macrocell 1502, the shared spectrum cell 1503, and the small cell RAN 1504 depending on the location of user mobile communications devices 1508(1)-1508(N).

In FIG. 15, the mobile telecommunications environment 1500 in this example is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1500 includes the enterprise environment 1506 in which the small cell RAN 1504 is implemented. The small cell RAN 1504 includes a plurality of small cell radio nodes 1512(1)-1512(C). Each small cell radio node 1512(1)-1512(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 15, the small cell RAN 1504 includes one or more services nodes (represented as a single services node 1514) that manage and control the small cell radio nodes 1512(1)-1512(C). In alternative implementations, the management and control functionality may be incorporated into a radio node, distributed among nodes, or implemented remotely (i.e., using infrastructure external to the small cell RAN 1504). The small cell radio nodes 1512(1)-1512(C) are coupled to the services node 1514 over a direct or local area network (LAN) connection 1516 as an example, typically using secure IPsec tunnels. The small cell radio nodes 1512(1)-1512(C) can include multi-operator radio nodes. The services node 1514 aggregates voice and data traffic from the small cell radio nodes 1512(1)-1512(C) and provides connectivity over an IPsec tunnel to a security gateway (SeGW) 1518 in a network 1520 (e.g., evolved packet core (EPC) network in a 4G network, or 5G Core in a 5G network) of the MNO 1510. The network 1520 is typically configured to communicate with a public switched telephone network (PSTN) 1522 to carry circuit-switched traffic, as well as for communicating with an external packet-switched network such as the Internet 1524.

The environment 1500 also generally includes a node (e.g., eNodeB or gNodeB) base station, or "macrocell" 1502. The radio coverage area of the macrocell 1502 is typically much larger than that of a small cell where the extent of coverage often depends on the base station configuration and surrounding geography. Thus, a given user mobile communications device 1508(1)-1508(N) may achieve connectivity to the network 1520 (e.g., EPC network in a 4G network, or 5G Core in a 5G network) through either a macrocell 1502 or small cell radio node 1512(1)-1512(C) in the small cell RAN 1504 in the environment 1500.

FIG. 16 is a schematic diagram illustrating exemplary DCSs 1600 that support 4G and 5G communications services. The DCSs 1600 in FIG. 16 can include one or more power distribution systems, including the power distribution system 400 in FIG. 4, configured to perform a line capacitance discharge of power conductors between a power source and a remote unit(s) when a safety disconnect of the power source is performed in response to a measured current from the connected power source when the remote unit is decoupled from the power source. The DCSs 1600 support both legacy 4G LTE, 4G/5G non-standalone (NSA), and 5G communications systems. As shown in FIG. 16, a centralized services node 1602 is provided that is configured to interface with a core network to exchange communications data and distribute the communications data as radio signals to remote subunits. In this example, the centralized services node 1602 is configured to support distributed communications services to a millimeter wave (mmW) radio node 1604. The functions of the centralized services node 1602 can be virtualized through an x2 interface 1606 to another services node 1608. The centralized services node 1602 can also include one or more internal radio nodes that are configured to be interfaced with a distribution node 1610 to distribute communications signals for the radio nodes to an open RAN (O-RAN) remote unit 1612 that is configured to be communicatively coupled through an O-RAN interface 1614.

The centralized services node 1602 can also be interfaced through an x2 interface 1616 to a BBU 1618 that can provide a digital signal source to the centralized services node 1602. The BBU 1618 is configured to provide a signal source to the centralized services node 1602 to provide radio source signals 1620 to the O-RAN remote unit 1612 as well as to a distributed router unit (DRU) 1622 as part of a digital DAS. The DRU 1622 is configured to split and distribute the radio source signals 1620 to different types of remote subunits, including a lower-power remote unit (LPR) 1624, a radio antenna unit (dRAU) 1626, a mid-power remote unit (dMRU) 1628, and a high-power remote unit (dHRU) 1630. The BBU 1618 is also configured to interface with a third party central unit 1632 and/or an analog source 1634 through a radio frequency (RF)/digital converter 1636.

FIG. 17 is a schematic diagram representation of additional detail illustrating a computer system 1700 that could be employed in any component or circuit in a power distribution system, including the power distribution system 400 in FIG. 4, configured to perform a line capacitance discharge of power conductors between a power source and a remote unit(s) when a safety disconnect of the power source is performed in response to a measured current from the connected power source when the remote unit is decoupled from the power source. In this regard, the computer system 1700 is adapted to execute instructions from an exemplary computer-readable medium to perform these and/or any of the functions or processing described herein. The computer system 1700 in FIG. 17 may include a set of instructions that may be executed to program and configure programmable digital signal processing circuits in a DCS for supporting scaling of supported communications services. The computer system 1700 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1700 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1700 in this embodiment includes a processing device or processor 1702, a main memory 1704 (e.g., read-only memory (ROM), flash memory, dynamic random access memory (DRAM), such as synchronous DRAM (SDRAM), etc.), and a static memory 1706 (e.g., flash memory, static random access memory (SRAM), etc.), which may communicate with each other via a data bus 1708. Alternatively, the processor 1702 may be connected to the main memory 1704 and/or static memory 1706 directly or via some other connectivity means. The processor 1702 may be a controller, and the main memory 1704 or static memory 1706 may be any type of memory.

The processor 1702 represents one or more general-purpose processing devices, such as a microprocessor, central processing unit, or the like, including the controller circuit 706. More particularly, the processor 1702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1702 is configured to execute processing logic in instructions for performing the operations and steps discussed herein.

The computer system 1700 may further include a network interface device 1710. The computer system 1700 also may or may not include an input 1712, configured to receive input and selections to be communicated to the computer system 1700 when executing instructions. The computer system 1700 also may or may not include an output 1714, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1700 may or may not include a data storage device that includes instructions 1716 stored in a computer-readable medium 1718. The instructions 1716 may also reside, completely or at least partially, within the main memory 1704 and/or within the processor 1702 during execution thereof by the computer system 1700, the main memory 1704 and the processor 1702 also constituting computer-readable medium. The instructions 1716 may further be transmitted or received over a network 1720 via the network interface device 1710.

While the computer-readable medium 1718 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information may be represented using any of a variety of different technologies and techniques. For example, data, instructions, commands, information, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the antenna arrangements may include any type of antenna desired, including but not limited to dipole, monopole, and slot antennas. The distributed antenna systems that employ the antenna arrangements disclosed herein could include any type or number of communications mediums, including but not limited to electrical conductors, optical fiber, and air (i.e., wireless transmission). The distributed antenna systems may distribute and the antenna arrangements disclosed herein may be configured to transmit and receive any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A remote subunit comprising:
a power input port configured to be coupled to a power conductor and receive a power signal from a power source therefrom;
a switch coupled to the power input port;
a first power output port configured to be coupled to a second power conductor to provide power from the remote subunit to a second cascaded remote subunit; and
a controller circuit configured to:
detect a first synchronization signal comprising a first periodic voltage drop in the power signal and time opening and closing of the switch based on the first synchronization signal;
a second power output port configured to be coupled to a third power conductor to provide power to an end device; and
a direct current-to-direct current (DC-DC) converter associated with the second power output port;
wherein the controller circuit is further configured to detect a second synchronization signal comprising a second periodic voltage drop in the power signal and send a reset signal to the DC-DC converter based on the second synchronization signal.

2. The remote subunit of claim 1, further comprising a diode bridge positioned between the power input port and the switch.

3. The remote subunit of claim 1, further comprising a load coupled to the switch.

4. The remote subunit of claim 1, wherein the second synchronization signal comprises a frequency lower than a frequency associated with the first synchronization signal.

5. The remote subunit of claim 1, wherein the second periodic voltage drop is contiguous with a voltage drop of the first periodic voltage drop.

6. The remote subunit of claim 1, wherein the controller circuit is configured to open and close the switch periodically.

7. The remote subunit of claim 1, wherein the remote subunit comprises a remote antenna unit.

8. A power distribution network comprising:
a power source;
a power conductor coupled to the power source; and
a remote subunit, comprising:
a power input port configured to be coupled to the power conductor and receive a power signal from the power source therefrom;
a switch coupled to the power input port;
a first power output port configured to be coupled to a second power conductor to provide power from the remote subunit to a second cascaded remote subunit; and
a controller circuit configured to:
detect a first synchronization signal comprising a first periodic voltage drop in the power signal and time opening and closing of the switch based on the first synchronization signal;
a second power output port configured to be coupled to a third power conductor to provide power to an end device; and
a direct current-to-direct current (DC-DC) converter associated with the second power output port;
wherein the controller circuit is further configured to detect a second synchronization signal comprising a second periodic voltage drop in the power signal and send a reset signal to the DC-DC converter based on the second synchronization signal.

9. The power distribution network of claim 8, further comprising a diode bridge positioned between the power input port and the switch.

10. The power distribution network of claim 8, further comprising a load coupled to the switch.

11. The power distribution network of claim 8, wherein the second synchronization signal comprises a frequency lower than a frequency associated with the first synchronization signal.

12. The power distribution network of claim 8, wherein the second periodic voltage drop is contiguous with a voltage drop of the first periodic voltage drop.

13. The power distribution network of claim 8, wherein the controller circuit is configured to open and close the switch periodically.

14. The power distribution network of claim 8, wherein the power source comprises a source switch coupled to the power conductor.

15. The power distribution network of claim 14, wherein the power source is configured to open and close the source switch to create the first synchronization signal.

* * * * *